United States Patent
Osaka

(10) Patent No.: US 7,827,553 B2
(45) Date of Patent: Nov. 2, 2010

(54) REGISTERING PROCESSING FLOW IN ACCORDANCE WITH USER PARAMETER

(75) Inventor: Hitoshi Osaka, Yokohama (JP)

(73) Assignee: Canon Kabushiki Kaisha (JP)

( * ) Notice: Subject to any disclaimer, the term of this patent is extended or adjusted under 35 U.S.C. 154(b) by 1036 days.

(21) Appl. No.: 11/555,419

(22) Filed: Nov. 1, 2006

(65) Prior Publication Data

US 2007/0106995 A1  May 10, 2007

(30) Foreign Application Priority Data

Nov. 4, 2005 (JP) ............................. 2005-321393

(51) Int. Cl.
*G06F 9/46* (2006.01)
(52) U.S. Cl. ...................... 718/100; 718/106
(58) Field of Classification Search .................. 718/100, 718/106
See application file for complete search history.

(56) References Cited

U.S. PATENT DOCUMENTS

| 2004/0193717 A1 | 9/2004 | Tajima et al. |
| 2006/0209359 A1 | 9/2006 | Kadowaki |

FOREIGN PATENT DOCUMENTS

| JP | 7-79306 A | 3/1995 |
| JP | 9-305660 A | 11/1997 |
| JP | 2001-306204 A | 11/2001 |
| JP | 2003-248637 A | 9/2003 |
| JP | 2004-287860 A | 10/2004 |
| JP | 2004-287862 A | 10/2004 |
| JP | 2004-312302 A | 11/2004 |
| JP | 2005-292259 A | 10/2005 |
| WO | 0125906 A1 | 4/2001 |

OTHER PUBLICATIONS

Extended search report issued in corresponding European patent application No. 06123384.7-1243, dated Dec. 19, 2007.
Office action issued in corresponding Japanese patent application No. 2005-321393, dated Feb. 29, 2008.

*Primary Examiner*—Meng-Ai An
*Assistant Examiner*—Brian Chew
(74) *Attorney, Agent, or Firm*—Rossi, Kimms & McDowell LLP

(57) ABSTRACT

In an information processing method of registering a processing flow, which defines cooperation processing of a plurality of tasks, in a manner that the processing flow can be shared by a plurality of users, a new processing flow is registered in association with a first user in response to a registration request of the new processing flow from the first user. In this stage, parameters of a task cooperated in the new processing flow are altered based on parameter information corresponding to another user different from the first user. Then, the new processing flow, where parameters have been altered, is registered in association with said another user.

13 Claims, 22 Drawing Sheets

FIG. 3

| TASK | EXAMPLE OF PARAMETERS |
|---|---|
| SCAN | DOUBLE-SIDE PRINTING, DOCUMENT RESOLUTION, IMAGE QUALITY, COLOR MODE, READING RESOLUTION, READING SCALING FACTOR |
| FILE TRANSMISSION | TRANSMISSION METHOD, TRANSMISSION ORIGINATOR, STORAGE LOCATION, LOGIN PASSWORD, STORAGE NAME (AUTOMATIC / SPECIFY), FILE FORMAT |
| MAIL TRANSMISSION | ADDRESS, FILE FORMAT |
| FAX TRANSMISSION | FACSIMILE NUMBER, RESOLUTION, COLOR MODE, NUMBER OF TIMES OF RETRY |
| PRINT | NUMBER OF COPIES, DOUBLE-SIDE PRINTING, COLOR MODE, etc. |
| NOTIFICATION MAIL | TEXT NOTIFYING END OF PROCESSING, ADDRESS |

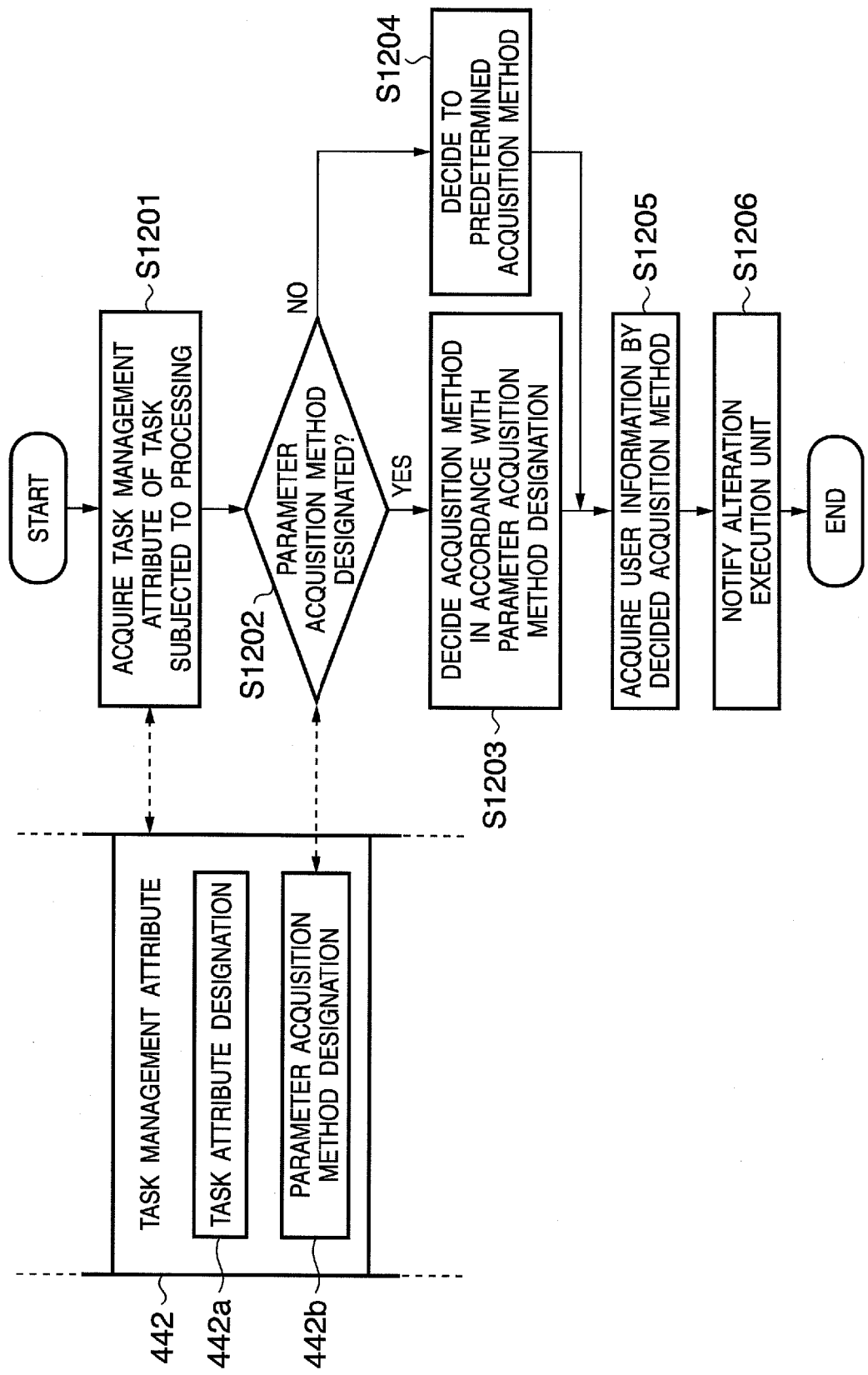

FIG. 18

| SCAN | PRINT | NOTIFICATION MAIL |
|---|---|---|
| FILE TRANSMISSION | MAIL TRANSMISSION | FAX TRANSMISSION |

STORED LOCATION: ¥¥server¥user

PROTOCOL: ftp

User: username 1

Password: ****

[ Set ]  [ Cancel ]

REGISTERING PROCESSING FLOW IN ACCORDANCE WITH USER PARAMETER

BACKGROUND OF THE INVENTION

1. Field of the Invention

The present invention generally relates to an information processing method, an information processing apparatus and an information processing system, particularly to managing a cooperation processing flow that defines cooperation of a plurality of tasks.

2. Description of the Related Art

Conventionally proposed is a system that enables setting for cooperative execution of plural processing (setting for cooperation of plural processing) that should be performed on document data using a network-connected apparatus. Also proposed is a method of reusing by other external apparatuses such setting for cooperative execution of plural processing. Japanese Patent Application Laid-Open No. 2004-287860 discloses a configuration for generating instruction data for cooperative execution of plural processing and enabling other external apparatuses to reuse the data. Note that, hereinafter such processing targeted for cooperation will be referred to as a task. A task is a unit of processing which can be realized by an individual function of, for example, a print processing apparatus having multiple functions, or individual processing that can be realized by an application program executed by an information processing apparatus or the like. For instance, tasks contained in a print processing apparatus include original document scanning, document data printing, facsimile transmission, mail transmission, data storage to disk (data storage in a hard disk inside or outside the print processing apparatus), and the like. A task cooperation processing flow is a combination of a series of tasks which are generated to process a plurality of the aforementioned tasks in chronological order. Various processing combinations are possible, including execution of one task using the result of another task. A system capable of executing processing according to such task cooperation processing flow is called a task cooperation processing system. In other words, a task cooperation processing system enables an apparatus to perform cooperative execution of plural types of tasks. For instance, the system enables a print processing apparatus to perform cooperative execution of various tasks including a task contained in the print processing apparatus.

In general, such task cooperation processing flow is generated by designating the combination and order of tasks using the operation system of a print processing apparatus or an information processing apparatus such as a computer. In this stage, it is common to designate not only the combination and order of tasks, but also detailed settings of the processing in each of the tasks.

Detailed setting items of, for example, a scanning task by a print processing apparatus include: a single-side/double-side setting, a monochrome/color setting, a resolution setting, and so on. Further, detailed setting items of, for example, a storing task in a hard disk outside a print processing apparatus (e.g., a file server) include: a transfer protocol, the address of a storage target, a login user name and a password for accessing the server, and the like. Note that the setting values necessary for task execution are called parameters.

Meanwhile, a task cooperation processing flow shared server system is known. In this system, a task cooperation processing flow such as the one mentioned above is generated and stored in a sharable manner so as to enable plural apparatuses to edit or execute the task cooperation processing flow. In the task cooperation processing flow shared server system (hereinafter referred to as a cooperation processing shared system), plural users can call up the task cooperation processing flow from plural print processing apparatuses or information processing apparatuses and execute the flow on the apparatus the flow is called up. In other words, the cooperation processing shared system is designated to enable various users to employ the task cooperation processing flow from various locations.

In such a cooperation processing shared system, since a task cooperation processing flow is shared by plural users, a task cooperation processing flow generated by one user can be reused by another user. Therefore, the labor of defining and generating the flow can be reduced. Furthermore, by sharing a standardized task cooperation processing flow, it is possible to commonize and communize document processes of the organization, improving the work efficiency.

However, although the above cooperation processing shared system has a method of disclosing the registered task cooperation processing flow to other users, it has the following problems.

In a task cooperation processing flow defined and registered by a user, each of the tasks included in the flow comprises various parameters as mentioned above. The parameters cover broad ranges. Particularly in the task cooperation processing flow designed mainly for a print processing apparatus, parameters of these tasks play an important role. If a user employs the registered task cooperation processing flow without knowing the state of the parameters, there is a high likelihood of outputting an unintended result. Therefore, with respect to a task cooperation processing flow designed mainly for a print processing apparatus, it is substantially impossible to use the flow defined by others.

For instance, assume that the order and combinations of plural tasks of a task cooperation processing flow perfectly matches the user's desired flow, but the scanning task of the print processing apparatus which is the first task has a lower resolution setting than what is desired by the user. In this case, the quality of outputted digital document or printout does not satisfy user's requirement. Furthermore, in a case where, for instance, a prescribed resolution is applied to the operation using the task cooperation processing flow, excessive use of the shared task cooperation processing flow may produce an undesired outcome.

In general, the combinations and order of tasks, that is, the tree structure of the flow is important in the task cooperation processing flow. However, as mentioned above, it is apparent that, for instance, in the task cooperation processing flow designed mainly for a print processing apparatus, the setting parameters of each task are as important as the tree structure.

Next described in detail is an example where it is desirable to have different settings of parameters in each task for each user employing the task cooperation processing flow. For instance, consider a task cooperation processing flow of scanning a paper document by a print processing apparatus, and transferring the document data to a file server to be stored.

In this flow, take notice of the task of "transferring data to a file server." The following situation can well happen: the file server destination of the transfer is "folder A of the server A" for user A and "folder B of the server B" for user B. Such a situation happens when a user digitalizes a scanned document and transfers the file data for backup of himself/herself.

As another example, consider a flow of printing document data on paper that has been scanned and stored in a storage device of a print processing apparatus. Take notice of the task of "printing." In this case, the following situation can happen: "2-in-1" printing is set for user A, "4-in-1" printing is set for user B, and "1-in-1 printing and double-side printing" is set for user C. Note that "2-in-1" printing is where two pages of data is reduced and printed in one page.

Considering the above usage cases, it can be concluded that the task cooperation processing flow is not worth using (worth sharing) unless, after the flow is once generated, the setting parameters of each task included in the flow are edited for each user and stored again. In other words, when the task cooperation processing flow is to be shared, there is a problem that the parameters of the flow must be edited for each user. This is the first problem in sharing the task cooperation processing flow.

Next, consider again the above-described task cooperation processing flow of scanning a paper document by a print processing apparatus and transferring the document data to a file server to be stored. This is a usage case where "no matter who executes this flow, all scanned document data are stored in a backup server of the group to which all users belong." In this case, the file server destination of the transfer should be set to "folder A of the server A" for users A and B.

Considering the above usage case, there are parameters that should not be changed for each user once the task cooperation processing flow is generated. If such parameters are freely edited, the flow may no longer be worth using. In other words, when a task cooperation processing flow is to be shared, there is a problem in that it is necessary to set a task that should maintain a fixed value for various users. This is the second problem in sharing the task cooperation processing flow.

Further, in view of realizing the system, the task tree structure can readily be expressed in a diagram using line elements connecting icons, and display can be designed such that the task tree structure can easily be confirmed on a monitor. However, since contents of the setting parameters of each task cover broad ranges and are complicated, it is difficult to design the display so that the setting parameters can be recognized at a glance. This is the third problem in sharing the task cooperation processing flow.

Since there is no task cooperation processing flow shared server system that can solve the above-described problems, the following situation occurs in reality. More specifically, even if a user generates a task cooperation processing flow, other users cannot use the flow without concern because the parameters of respective tasks included in the processing flow are unknown. This causes the problem of "unshared" registered processing flow among plural users. As a result, the significance of the server for sharing a task cooperation processing flow is completely lost.

SUMMARY OF THE INVENTION

The present invention has been made in view of the above-described problems. The object of the present invention is to provide a system for registering a task cooperation processing flow in a sharable manner, and to enable registration of a new processing flow in a manner that the processing flow can be used by respective users and is adapted to the usage style of each user.

According to one aspect of the present invention, there is provided an information processing method of registering a processing flow, which defines cooperation processing of a plurality of tasks, in a manner that the processing flow can be used by a plurality of users, comprising: a storing step of storing parameter information for setting parameters in a parameter information storage unit; a first registration step of registering a new processing flow in association with a first user in response to a registration request of the new processing flow from the first user; a first alteration step of altering a parameter of a task cooperated in the new processing flow based on parameter information, stored in the parameter information storage unit, corresponding to another user different from the first user; and a second registration step of registering the new processing flow, where the parameter has been altered by said first alteration step, in association with said another user.

Furthermore, according to another aspect of the present invention, there is provided an information processing apparatus for registering a processing flow, which defines cooperation processing of a plurality of tasks, in a manner that the processing flow can be used by a plurality of users, comprising: a storing unit adapted to store parameter information for setting parameters in a parameter information storage unit; a first registration unit adapted to register a new processing flow in association with a first user in response to a registration request of the new processing flow from the first user; a first alteration unit adapted to alter a parameter of a task cooperated in the new processing flow based on parameter information, stored in the parameter information storage unit, corresponding to another user different from the first user; and a second registration unit adapted to register the new processing flow, where the parameter has been altered by said first alteration unit, in association with said another user.

Furthermore, according to another aspect of the present invention, there is provided an information processing system having a server apparatus storing a processing flow, which defines cooperation processing of a plurality of tasks, in a manner that the processing flow can be used by a plurality of users, comprising: storing unit adapted to store parameter information for setting parameters in a parameter information storage unit; in the server apparatus, a first registration unit adapted to register a new processing flow in association with a first user in response to a registration request of the new processing flow from the first user; in the server apparatus, a first alteration unit adapted to alter a parameter of a task cooperated in the new processing flow based on parameter information, stored in the parameter information storage unit, corresponding to another user different from the first user among the plurality of users; in the server apparatus, a second registration unit adapted to register the new processing flow, where the parameter has been altered by said first alteration unit, in association with said another user; and in the server apparatus, an execution unit adapted to execute a processing flow registered in association with a user in response to a processing request from the user.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a view showing an example of setting parameters contained in each task, which are handled by a cooperation processing flow edited by the editing application program;

FIG. 12 is an explanatory view of user information acquisition processing according to the third embodiment;

FIG. 18 is a view showing an example of a user interface for registering and setting user information.

DESCRIPTION OF THE EMBODIMENTS

Preferred embodiments of the present invention will now be described in detail in accordance with the accompanying drawings.

First Embodiment

Application Configuration

Figure 1:
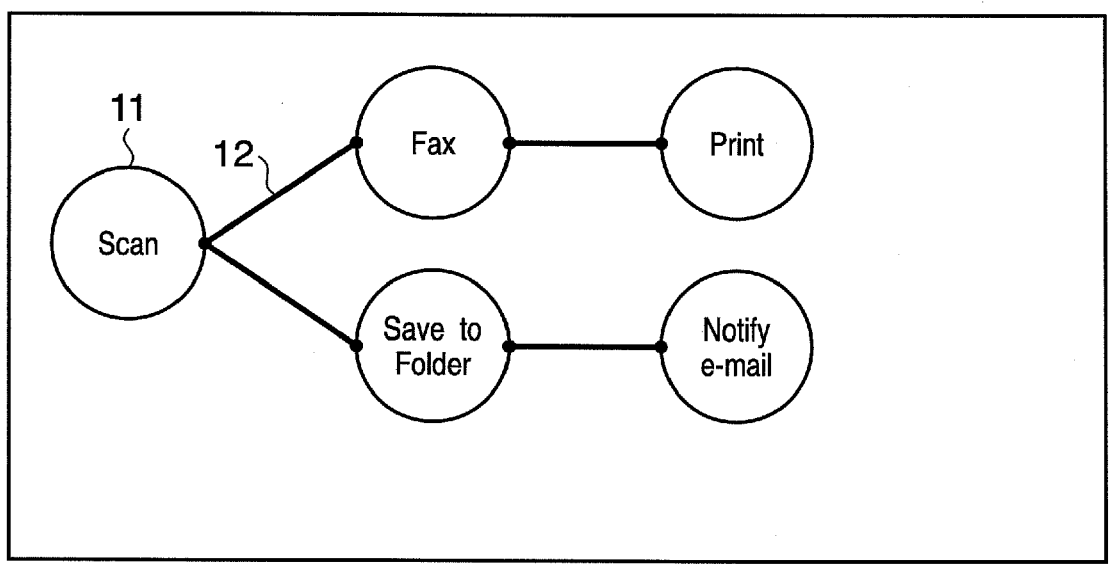
FIG. 1 is a view showing an image of a task cooperation processing flow editing application program that is the subject of the present embodiment.

FIG. 1 is a view showing an image of a task cooperation processing flow editing application program (hereinafter referred to as an editing application program) that is the subject of the present embodiment. As shown in FIG. 1, plural tasks represented by circular graphic elements 11 are connected by ramal line elements 12 to produce a tree structure, thereby constructing a series of processing (task cooperation processing flow). In the editing application program, tasks are arranged on a display device by a general graphic user interface (GUI) system, and the tasks are connected with line elements to design a task cooperation processing flow with simple operation. Note that the editing application program is executable by a print processing apparatus or an information processing apparatus connected to a computer-cooperated shared system. Since the task cooperation processing flow generation processing using such user interface is apparent to those who are skilled in the art, no particular description is provided in this specification.

Figure 2:
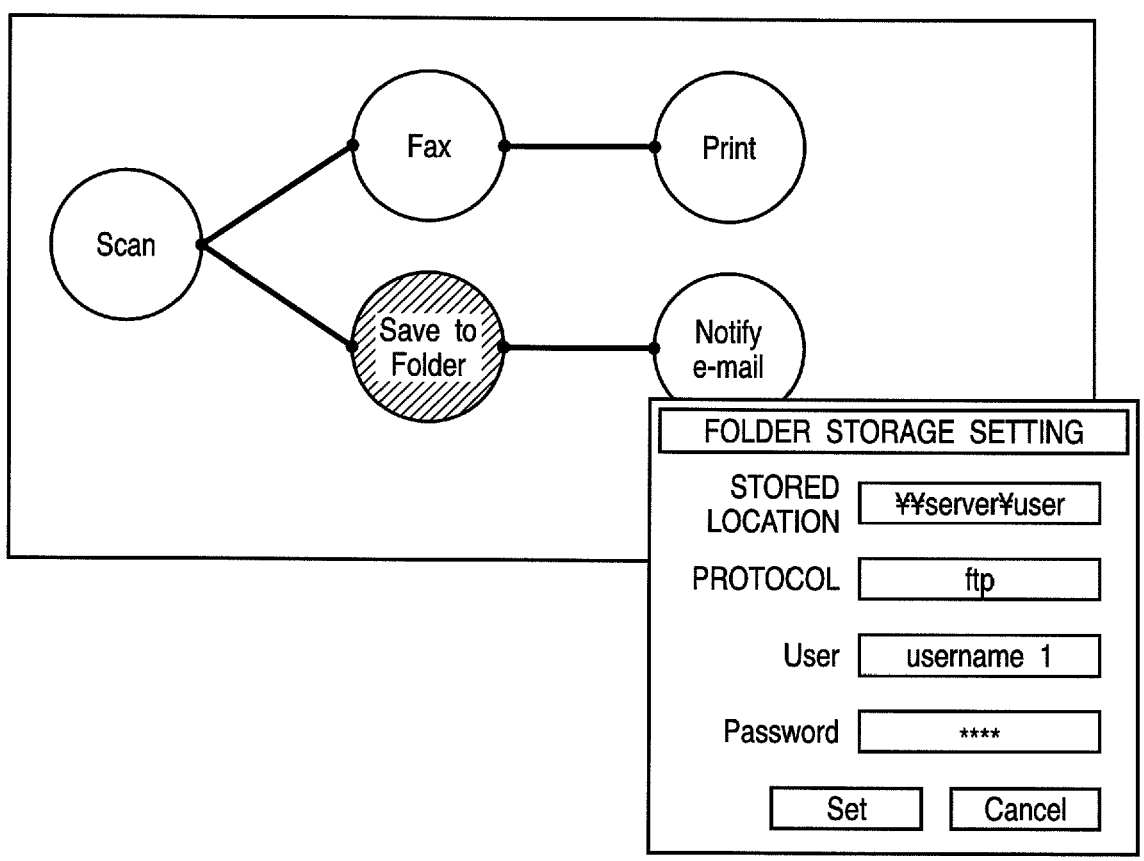
FIG. 2 is a view showing a display example of setting parameters of each task included in the task cooperation processing flow shown in FIG. 1.

FIG. 2 is a view showing a display example of setting parameters of each task included in the task cooperation processing flow shown in FIG. 1. In general, since plural parameters exist as a group in one task, the user interface can display them as a list. For instance, when an arbitrary task is selected in the task cooperation processing flow, the parameter setting related to the selected task is displayed as shown in FIG. 2. By virtue of such display, a user is able to easily comprehend the parameters set in each task. Note that the operation for displaying the parameters, the parameter displaying method, and the parameter setting method are not limited to the example of the present embodiment.

FIG. 3 is a view showing an example of setting parameters contained in each task, which are handled by the cooperation processing flow edited by the editing application program. In the present embodiment, assume that the task means processing that can be executed on a document or data. FIG. 3 cites, as the tasks of a print processing apparatus, scanning, file transmission of document data (storage of data in a hard disk of the print processing apparatus), mail transmission, facsimile transmission, printing, and notification mail. However, tasks are not limited to these examples. Besides the print processing apparatus providing the above tasks, the task cooperation processing system is capable of cooperating with plural application programs that can provide various tasks. Furthermore, in the present embodiment, a print processing apparatus and an application program that can execute tasks are defined as a task processing apparatus. The following example gives a case where a print processing apparatus serves as a task processing apparatus.

Figure 4A:
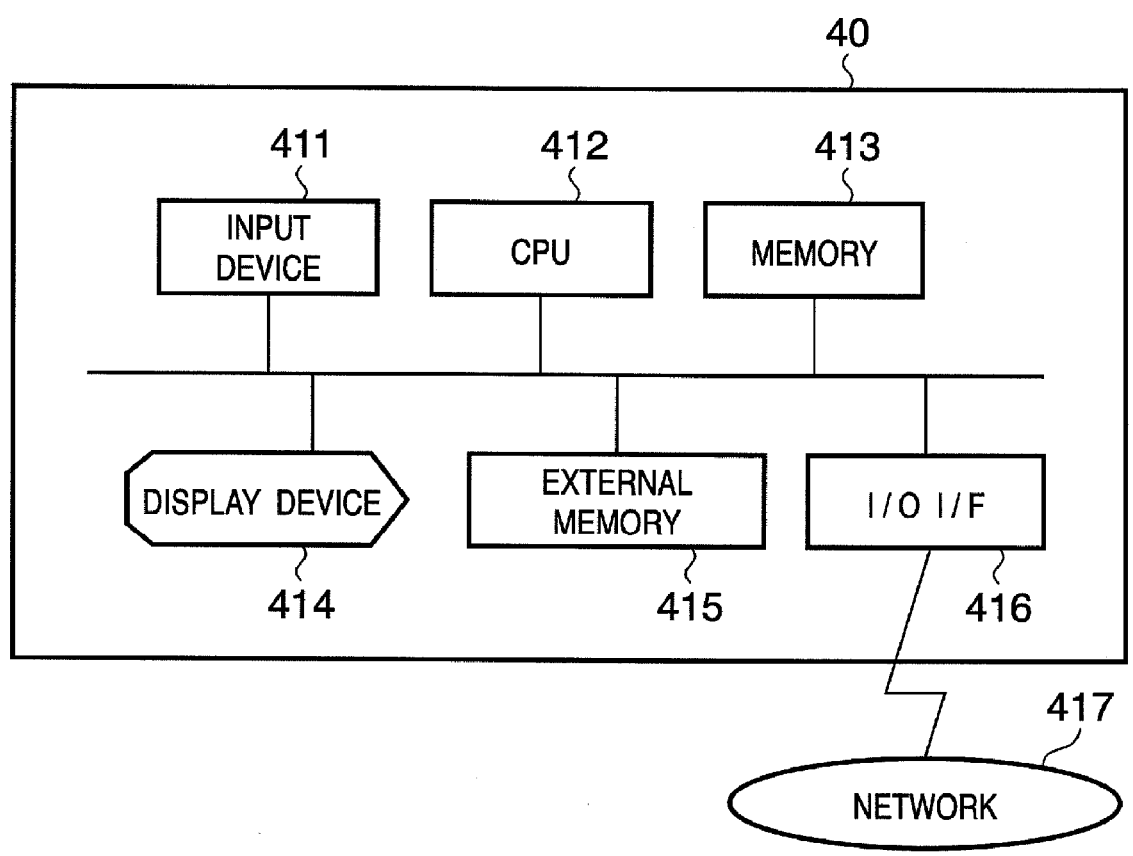
FIG. 4A is a block diagram showing a hardware construction of an information processing apparatus that can execute the editing application program according to an embodiment of the present invention.

First described is a construction of an information processing apparatus that can execute the editing application program. FIG. 4A is a block diagram showing a hardware construction (computer system) of information processing apparatuses 51 and 55 as well as a shared server 52 (FIG. 5) that can execute the editing application program according to the present embodiment. A computer system 40 has the following configuration as its main unit. A CPU 412 is a central processor. Memory 413, including RAM, ROM, and the like, serves as a main storage device. An external memory 415 includes an FD drive or a HD drive. An input device 411 is configured with a keyboard and a pointing device such as a mouse. A display device 414, configured with a CRT display or a liquid crystal display, performs various displaying under the control of the CPU 412. An external input/output interface 416 connects the information processing apparatus to a network 417.

Note that this computer system adopts a server-client system as will be described later. The server and client are realized by executing a basic I/O program, an OS, and a predetermined program by the CPU 412. More specifically, each processing that will be described later with reference to the accompanying flowcharts is realized by executing the (loaded) control program stored in the memory 413 by the CPU 412.

The basic I/O program is written in the memory 413. The OS is written in the external memory 415 such as a hard disk, a flexible disk, or the like. When the power of the control device is turned on, the OS is read from the external memory 415 to the memory 413 (RAM) by the initial program loading function of the basic I/O program, and the OS operation is started.

Figure 4B:
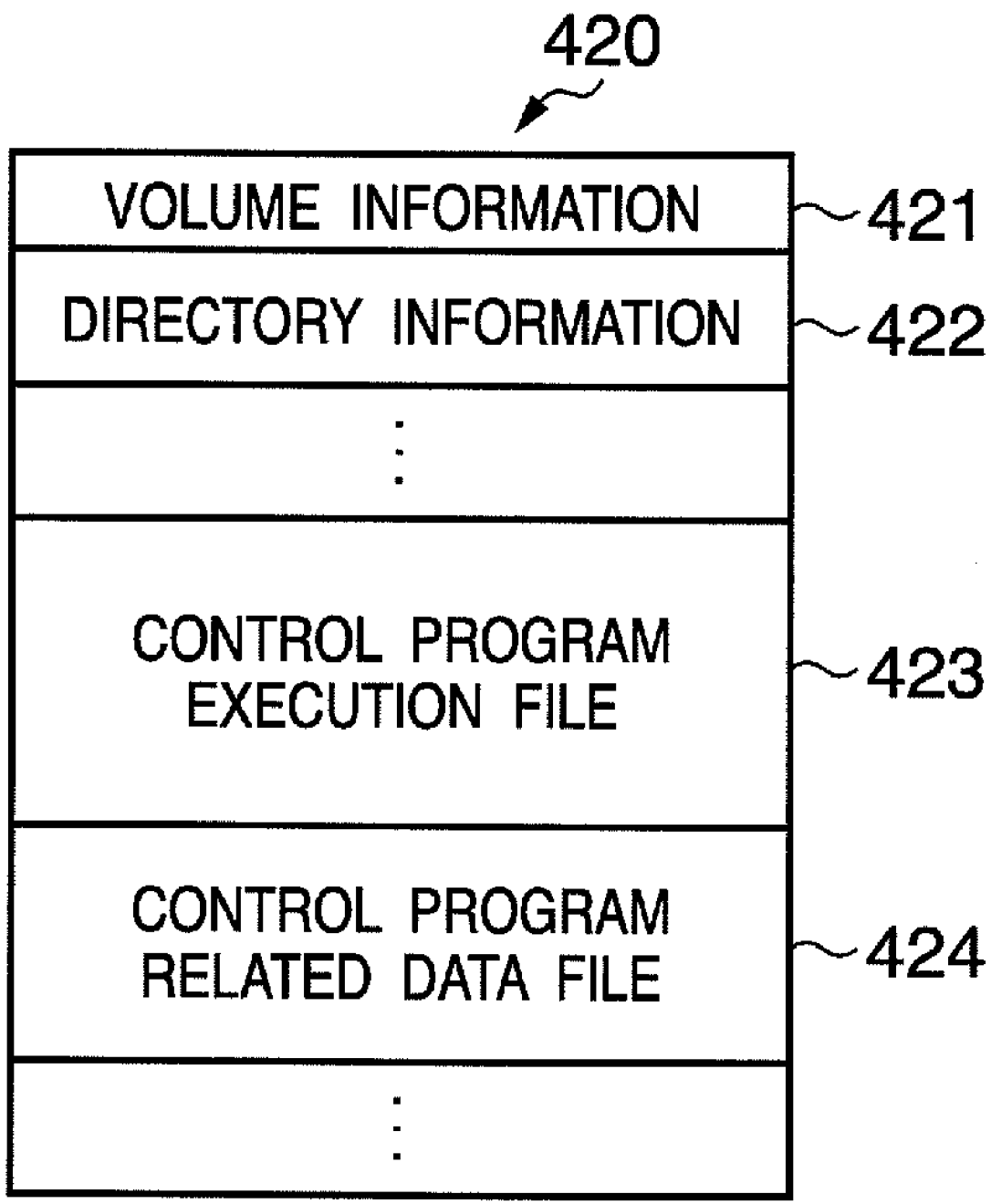
FIG. 4B is a view showing a memory map having a state in which a control program and related data are recorded in an external memory.

The program is coded based on the flowchart of the control procedure shown in the drawing which will be described later. In the case of the present embodiment, the control program and related data are recorded in the external memory 415. The construction of the recorded contents is shown in FIG. 4B.

The control program and related data recorded in, e.g., a floppy (registered trademark) disk (FD) are loaded to the computer system 40 through an FD drive. For instance, when an FD recording the data 420 shown in FIG. 4B is set in the FD drive and execution of the control program execution file 423 is instructed, the control program and related data are read out of the FD under the control of the OS and the basic I/O program. More specifically, the control program execution file 423 and the control program related data file 424 are loaded from the external memory 415 to the memory 413 (RAM) and become executable. Note that, in FIG. 4B, numeral 421 denotes volume information and numeral 422 denotes directory information.

Figure 4C:
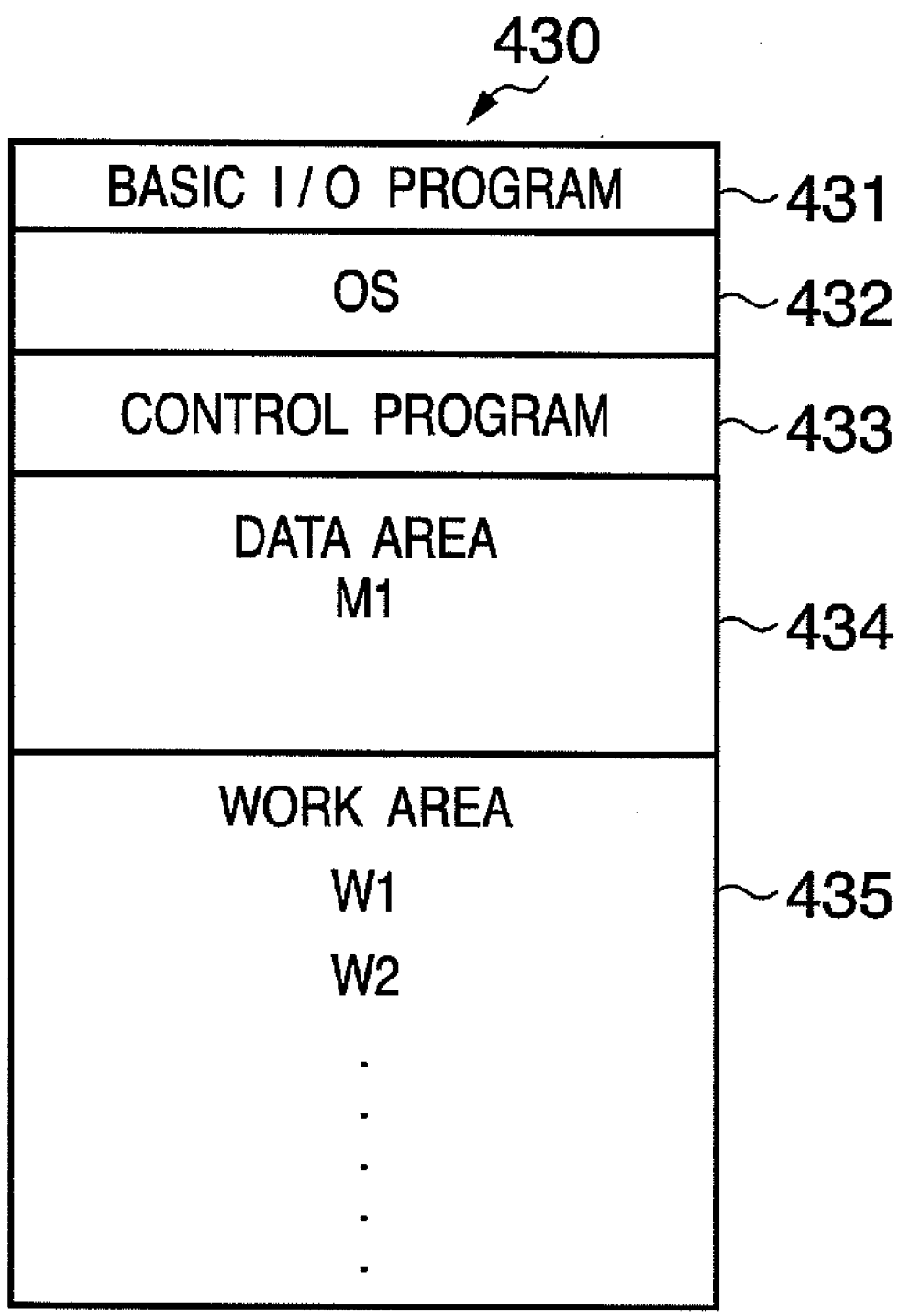
FIG. 4C is a view showing a memory map having a state in which the control program is loaded to a RAM and becomes executable.

FIG. 4C shows a memory map having a state in which the control program is loaded to the RAM and becomes executable. According to the memory map shown by FIG. 4C, basic I/O program area 431, OS (operating system) area 432, control program area 433, data area 434, and work area 435 are included. Although the above description gives an example of employing an ED as the external memory 415 and loading the control program and the related data directly to the memory 413 (RAM) from the FD, the present invention is not limited to this. For instance, the program and related data may be stored in a HOD serving as the external memory 415 and may be loaded from the HDD. Furthermore, a medium serving as the external memory 415 for recording the control program may be of an optical disk, an IC memory card, and the like. Still further, the program may be recorded in a read-only memory (ROM) of the memory 413 and may be executed directly by the CPU 412.

Figure 4D:
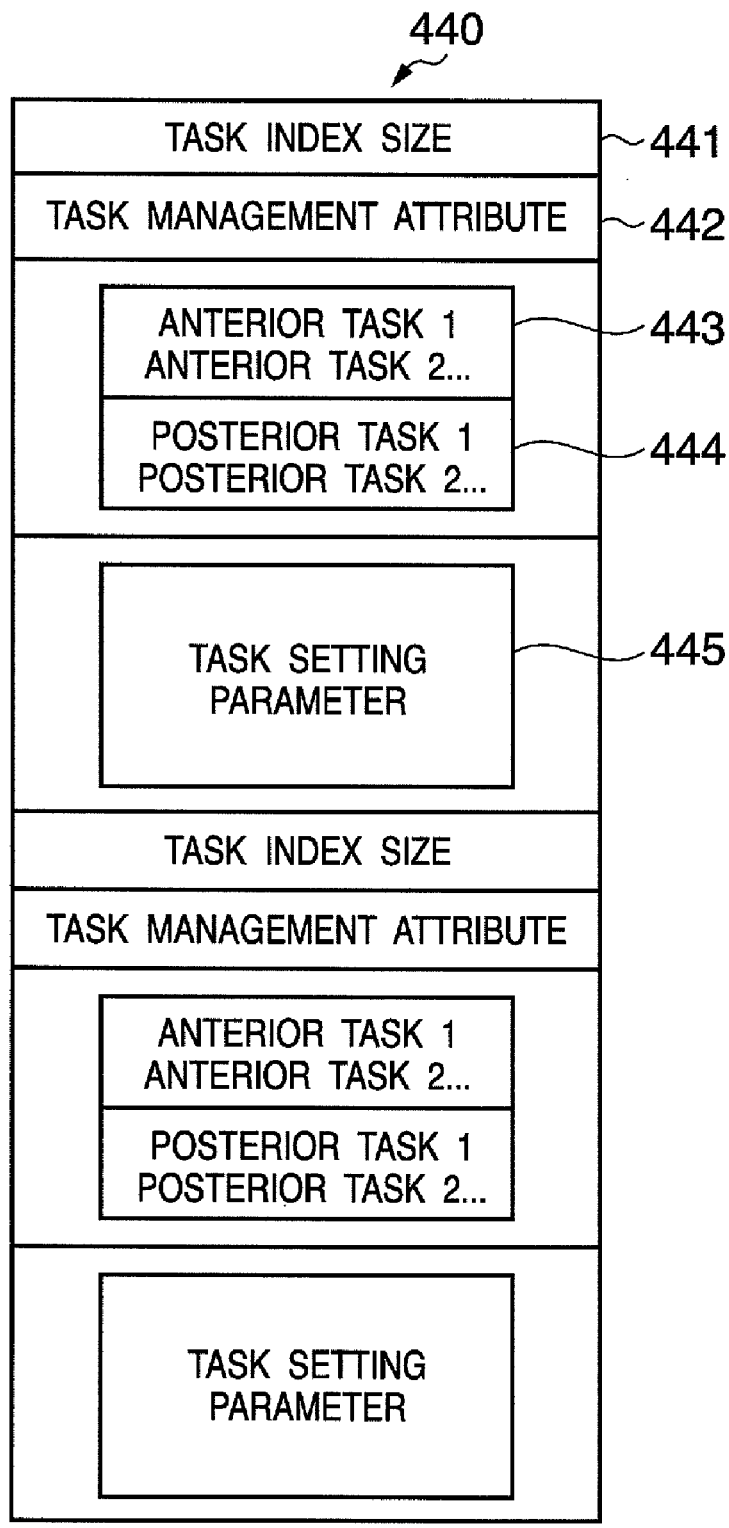
FIG. 4D is a view showing an example of a data structure of a task cooperation processing flow when the flow is generated and edited by the editing application program and stored in a memory 413 or an external memory 415.

FIG. 4D is a view showing an example of a data structure of the task cooperation processing flow when the flow is generated and edited by the editing application program and stored in the memory 413 or the external memory 415. In the data structure of the task cooperation processing flow 440 in FIG. 4D, the data structure representing each task of the flow is managed by index so that information on all tasks can be accessed sequentially. In the task index size 441, a task's index value and a data structure size (data size from reference number 441 to 445) indicative of the task are stored.

Included inside the task are the index 443 indicative of the anterior task, and the index 444 indicative of the posterior task. By virtue of these indexes 443 and 444, the anteroposterior relation (cooperation) of tasks on the tree can be acquired. Besides, the type of task and setting parameters contained in the type of task are stored as the task setting parameter 445 in a variable-length data structure. Since the setting parameter 445 has a variable length, the size of the data structure of one task is stored as the task index size 441 together with the index. Furthermore, the task management attribute 442 that will be described in the latter example is also stored in an easy-to-access form.

[System Construction]

Figure 5:
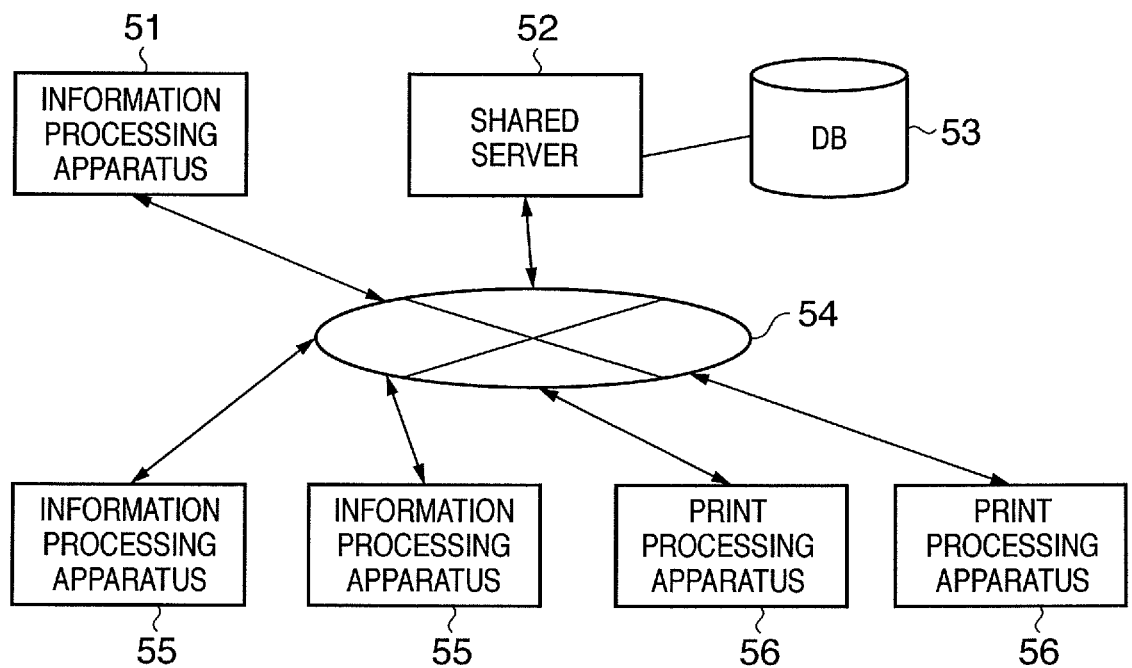
FIG. 5 is a view showing an example of a system construction that can execute the task cooperation processing flow generated and edited by the editing application program.

FIG. 5 is a view showing an example of a system construction that can execute the task cooperation processing flow generated and edited by the above editing application program.

The system shown in FIG. 5 is a server-client system. The information processing apparatuses 51 and 55 as well as the task cooperation processing flow shared server (hereafter referred to as the shared server) 52 have the construction described in FIG. 4A. The information processing apparatuses 51 and 55 as well as the print processing apparatus 56 serve as a client, while the shared server 52 serves as a server. The network 54 corresponds to the network 417 in FIG. 4A. For instance, in the information processing apparatus 51, a user can generate a task cooperation processing flow utilizing the editing application program. The generated task cooperation processing flow is registered in the shared server 52 through the network 54. The shared server 52 manages the task cooperation processing flow and the like using a database 53. To execute a predetermined task cooperation processing flow, the print processing apparatus 56 instructs the processing flow to be executed as well as execution of the processing flow to the shared server 52.

Connection processing for cooperating between the information processing apparatus 51 and the shared server 52 is described with reference to the flowchart in FIG. 6. In step S601, the information processing apparatus 51 requests an access to the shared server 52 in accordance with a user's access instruction. When the shared server 52 receives an access in step S611, the server transmits in step S612 a login screen to the information processing apparatus 51 that is the request originator. The information processing apparatus 51 displays the login screen in step S602 and requests login ID and password input. When a login ID and a password are inputted, they are transmitted to the shared server 52.

In step S613, the shared server 52 performs authentication of the received login ID and password. When the authentication fails (NG), the control returns to step S612 and prompts the information processing apparatus 51 to input a login ID and a password again. Meanwhile, when the authentication succeeds (OK), the control proceeds from step S613 to S614, and allows connection of the information processing apparatus 51. As a result, the information processing apparatus 51 and the shared server 52 establishes connection (steps S603, S614). In this state, the user is able to register in the shared server 52 the task cooperation processing flow generated by the information processing apparatus 51.

The other information processing apparatus 55 in FIG. 5 can also establish connection with the shared server 52 in the above-described manner. The print processing apparatus 56, which is a multi-functional print processing apparatus capable of displaying a user interface such as a login screen, is able to connect to the shared server 52. In other words, the information processing apparatus 55 and the print processing apparatus 56 can also establish connection with the shared server 52 by the processing described in FIG. 6, and after connection, can call up and execute the task cooperation processing flow allowed in the user area of itself.

In this state, assume that the called task cooperation processing flow is temporarily downloaded to the information processing apparatus or the print processing apparatus that is the calling originator, and executed on the respective apparatuses. Note that the flow may be executed on the shared server 52, and the processing itself of each task may be executed as a function execution command for the respective apparatuses. In this case, the shared server 52 outputs an execution instruction to each task processing apparatus for executing the processing flow designated by the client. Since the shared server 52 holds information of the processing flow, it understands which processing to be executed by what device. Therefore, the shared server 52 itself can perform controlling of the processing flow to transmit the processing execution instruction of each task to the respective apparatuses. Note that the present embodiment does not particularly prescribe an execution form of the task cooperation processing flow.

Figure 7:
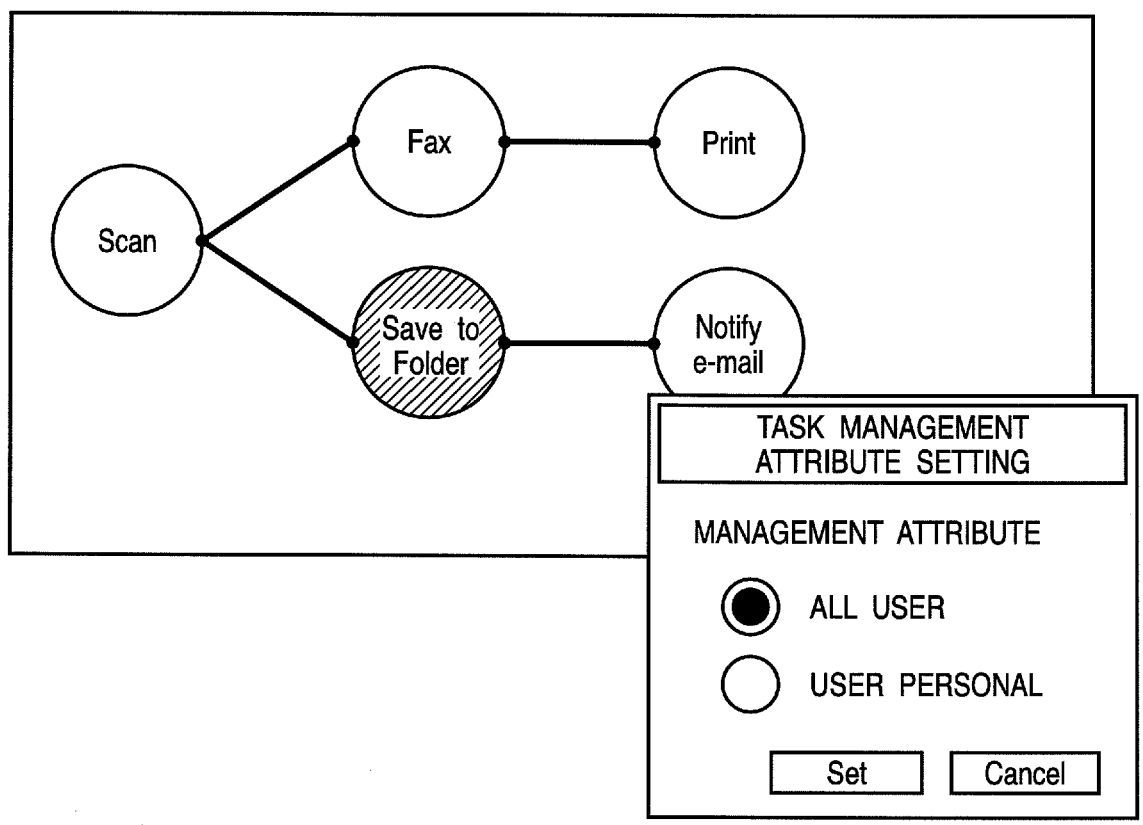
FIG. 7 is a view showing a display example of a user interface for setting a task management attribute.

When the task cooperation processing flow is defined in the aforementioned editing application program, the first embodiment provides a construction for defining each task as an "all-user task" or a "user-personal task." For instance, the setting interface shown in FIG. 7 is provided to allow setting of "all-user task" or "user-personal task" with respect to each task. Each task included in the generated task cooperation processing flow always belongs to the "all-user task" or the "user-personal task." These attributes are called a "task management attribute." The task management attributes are held in the data structure of the task cooperation processing flow in association with each task in an easy-to-access manner as shown in FIG. 4D (task management attribute 442 in FIG. 4D).

Figure 8:
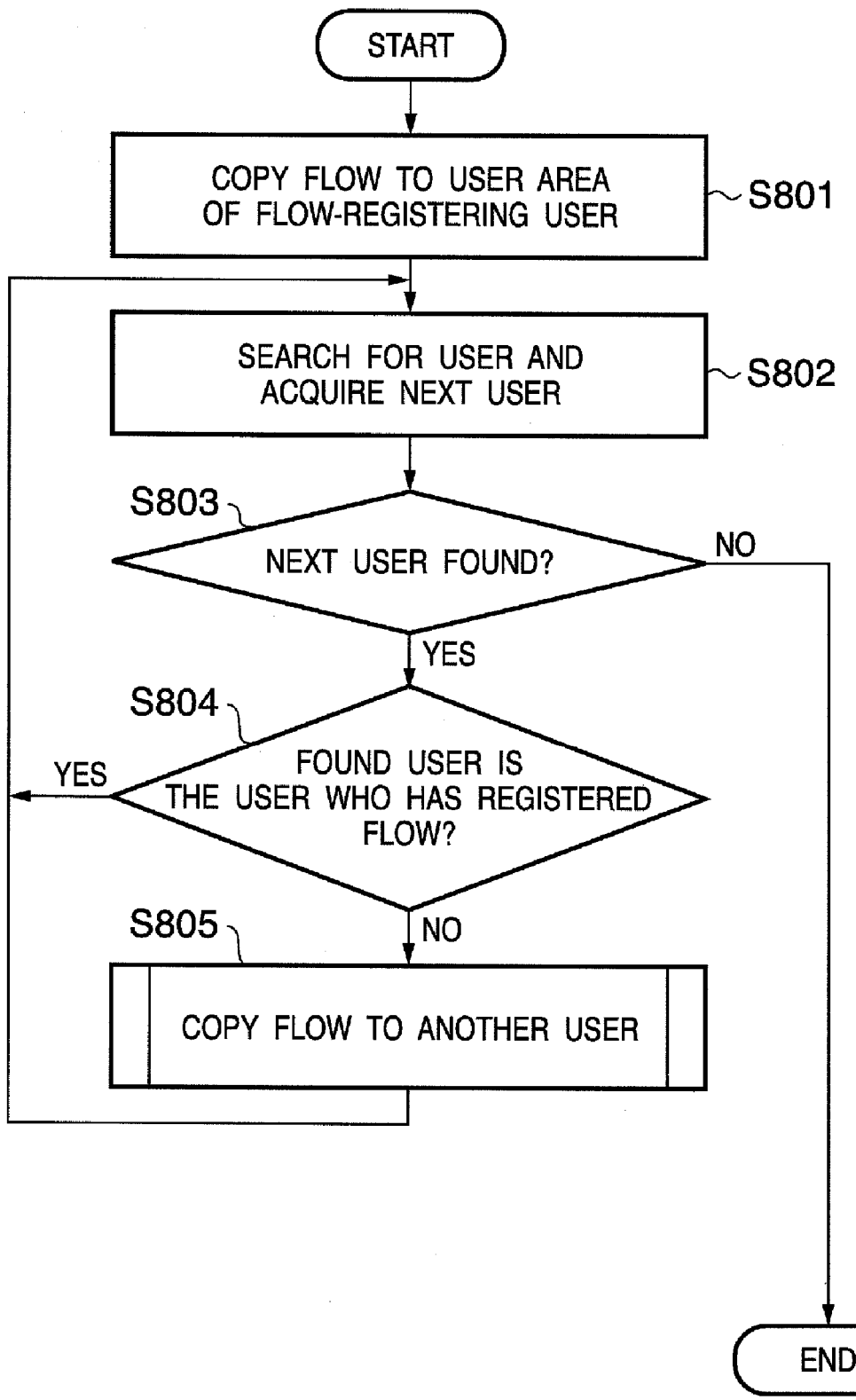
FIG. 8 is a flowchart describing copying (registration) processing of the task cooperation processing flow to each user area of the shared server.
Figure 9:
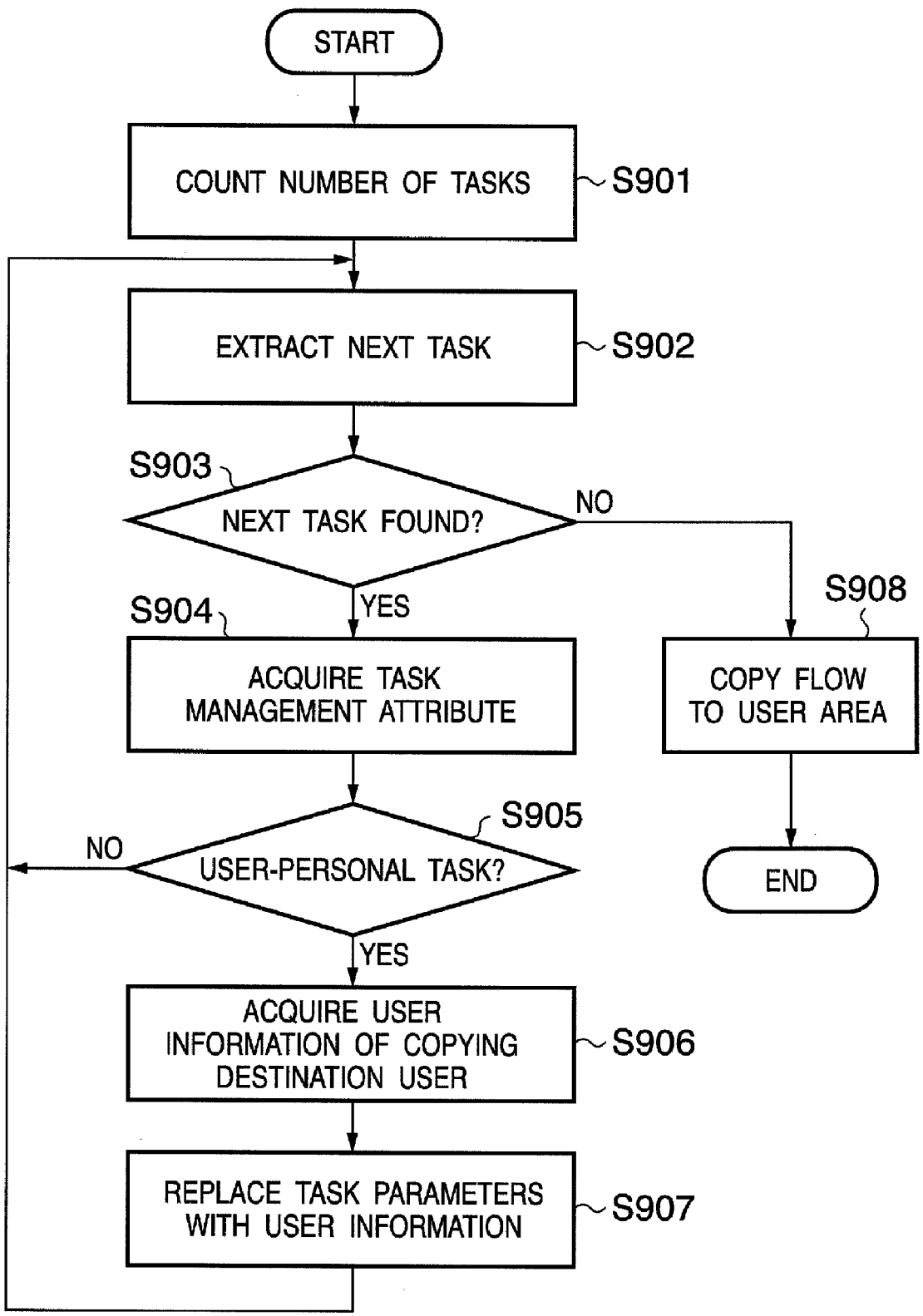
FIG. 9 is a flowchart describing copying processing of the task cooperation processing flow to a user area of the shared server.
Figure 10:
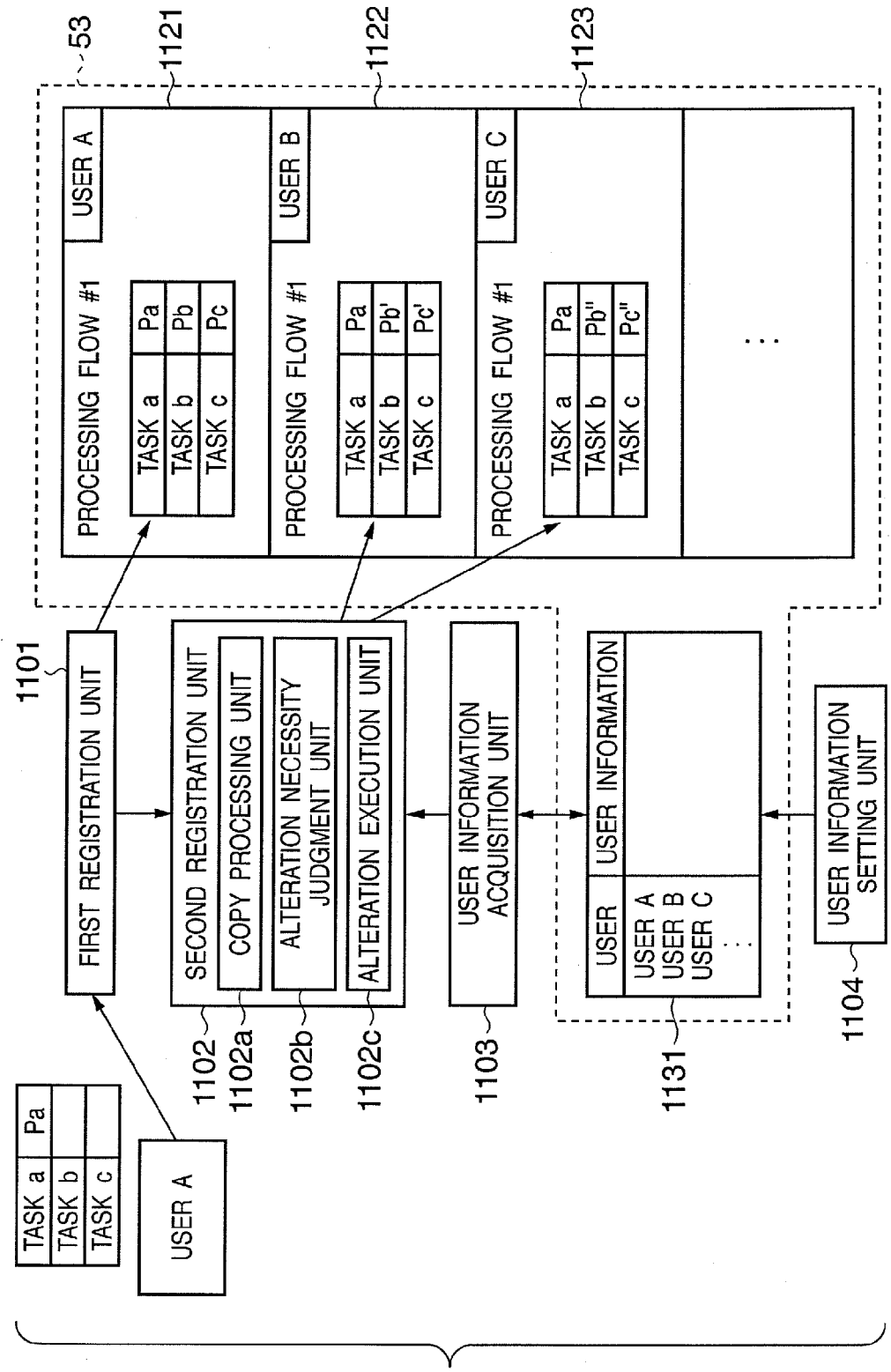
FIG. 10 is an explanatory view of task cooperation processing flow registration processing according to the first embodiment.

In the system described in FIGS. 4A to 4D, 5 and 6, described next is how to register the task cooperation processing flow 440 (FIG. 4D), including the defined task management attribute, in the database 53 of the shared server 52 in a sharable manner. The description is provided with reference to the flowcharts in FIGS. 8 and 9 as well as the functional configuration view in FIG. 10. Note that the functions of respective units 1101 to 1104 in FIG. 10 are realized by executing a control program stored in the memory 413 by the CPU 412 of the shared server 52. Also, hereinafter, an apparatus (for example, information processing apparatus 51, 55 or print processing apparatus 56) logged in by user A is referred to as "user A apparatus".

When a user attempts to register a task cooperation processing flow in the shared server 52, the shared server 52 performs copying in the following procedure, thereby achieving sharing of the task cooperation processing. In step S801, the task cooperation processing flow to be registered is copied to the user area of the shared server 52 that belongs to the user (user A apparatus in FIG. 10) who has called up the registration. Referring to FIG. 10, the first registration unit 1101 copies a task cooperation processing flow #1 such as that shown in FIG. 4D transmitted from the user A apparatus to the user A area 1121 that is secured in the database 53. Note that the task cooperation processing flow recorded in the user A area can be accessed only by the user A apparatus. In other words, recording the task cooperation processing flow in the user A area means to register the task cooperation processing flow in association with user A. Further in other words, the task cooperation processing flow is registered in a manner that it can only be accessed by user A.

In steps S802 to S805, the task cooperation processing flow is copied to the user areas of users, who have an account in the shared server 52, besides the user who has executed the registration. Referring to FIG. 10, the second registration unit 1102 registers the task cooperation processing flow received from the user A apparatus to the user areas (1122, 1123, . . . ) secured in the database 53 for other users registered in the shared server 52. In this stage, parameters of each task included in the task cooperation processing flow that is being registered in each user's area are altered based on the user information set for the corresponding user (user corresponding to the copying destination area).

In step S802, the second registration unit 1102 of the shared server 52 searches the server for an account and specifies a user. After specifying a user, the control proceeds from step S803 to S804 to determine whether or not the specified user is user A who has registered said task cooperation processing flow. As a result of determination, if it is user A (YES), the control returns to step S802 to searches for a next user. If it is not user A (NO) as a result of determination, the control proceeds to step S805, and processing shown in FIG. 9 (copying of the flow to another user) is executed regarding the user. For instance, if user B is specified, the processing flow received from the user A apparatus is copied to the user B area 1122 in step S805. Note in the processing in step S805, task parameters are altered based on user information. The aforementioned steps S802 to S805 are repeated until the next user is no longer found in step S803, and the copying processing ends.

Next, the above-described processing in step S805 (copying of the flow to another user) is described with reference to FIG. 9.

In step S901, the number of tasks included in the task cooperation processing flow subjected to copying is obtained from the data structure shown in FIG. 4D. In steps S902 to S905, the alteration necessity judgment unit 1102b determines whether or not it is necessary to alter the parameters regarding each task of the task cooperation processing flow. In steps S906 and S907, the alteration execution unit 1102c alters the parameters based on user information with respect to the task that requires parameter alteration.

More specifically, in step S902 a task included in the task cooperation processing flow that is being registered is extracted. After extracting the task, the control proceeds from step S903 to S904, and the task management attribute 442 regarding the extracted task is acquired. In step S905, it is determined whether the task management attribute 442 is an "all-user task" or a "user-personal task." If the determination finds that the task is a "user-personal task," then in step S906 user information of the user corresponding to the user area where the task cooperation processing flow is to be copied is acquired in order to replace setting parameters of the task. More specifically, a user information acquisition unit 1103 acquires user information of the user, which corresponds to the copying destination user area, from the user information storage unit 1131 where user information is registered in association with each user. Contents of the user information will be described later. When user information is acquired, in step S907 the alteration execution unit 1102c extracts parameters necessary for the task from the user information, and replace the initial setting parameters that have been set when the task cooperation processing flow is registered by user A. Meanwhile, if the determination in step S905 finds that the task is an "all-user task," the setting parameters of the task are not replaced from the initial parameters that have been registered by the user A; thus the control returns to step S902.

After the above processing is performed, the next task is extracted from the task array of the task cooperation processing flow (step S902), and the same processing (steps S903 to S907) is repeated. The above processing is repeated for all tasks of the registered task cooperation processing flow. When the next task is no longer found (step S903), the copying processing unit 1102a copies the task cooperation processing flow obtained as a result of the above processing to the copying destination user area (step S908), and the control ends. Note that the process of copying to the user area may include registering the task cooperation processing flow to the system, or may be mere recording of the task cooperation processing flow in a storage medium. For instance, in a case where the processing flow is managed by the database 53, data registration to the database 53 may be included to the copying process. In a case where the processing flow is to be written in a storage device such as a fixed disk, the writing itself is the copying process. Note, since registration to the database or writing is apparent to those who are skilled in the art, detailed description is omitted in this specification.

In the example in FIG. 10, since the task management attribute 442 of task a is an "all-user task," the parameters are not altered in the task cooperation processing flow registered for each user. Meanwhile, since the task management attribute 442 of tasks b and c is a "user-personal task" and there is user information corresponding to users B and C, the parameters are altered respectively.

Next, user information used in steps S906 and S907 is described.

Parameters of a task include the aforementioned example shown in FIG. 3. The present embodiment assumes that each user registers a "value to be used as a user-personal task" in the user information at the time of registering an account in the shared server 52. For instance, parameters are set to "always use 2-in-1 and double-side printing for personal task of 'printing'." To register such user information, the interface should show an input area that includes all parameters of all tasks exemplified in FIG. 3. In other words, since the "value to be used as a user-personal task" must be set comprehensively for the account, it is necessary that the interface enables setting on various parameters of plural tasks. For this purpose, it is necessary to provide a user interface, such as the extended setting window shown in FIG. 2, which can set parameters of all types of task. Although FIG. 2 only allows parameter setting with respect to a task stored in a folder, it is necessary to enable parameter setting with respect to other tasks shown in FIG. 3. To display multiple parameters divided into multiple categories in, e.g., one window, a user interface that utilizes tab switching shown in FIG. 18 may be employed. Besides the occasion of account registration, altering and setting of user information can be performed, needless to say. Hereinafter, such user information explicitly set by the user will be referred to as "user information registered and set by the user."

Figure 6:
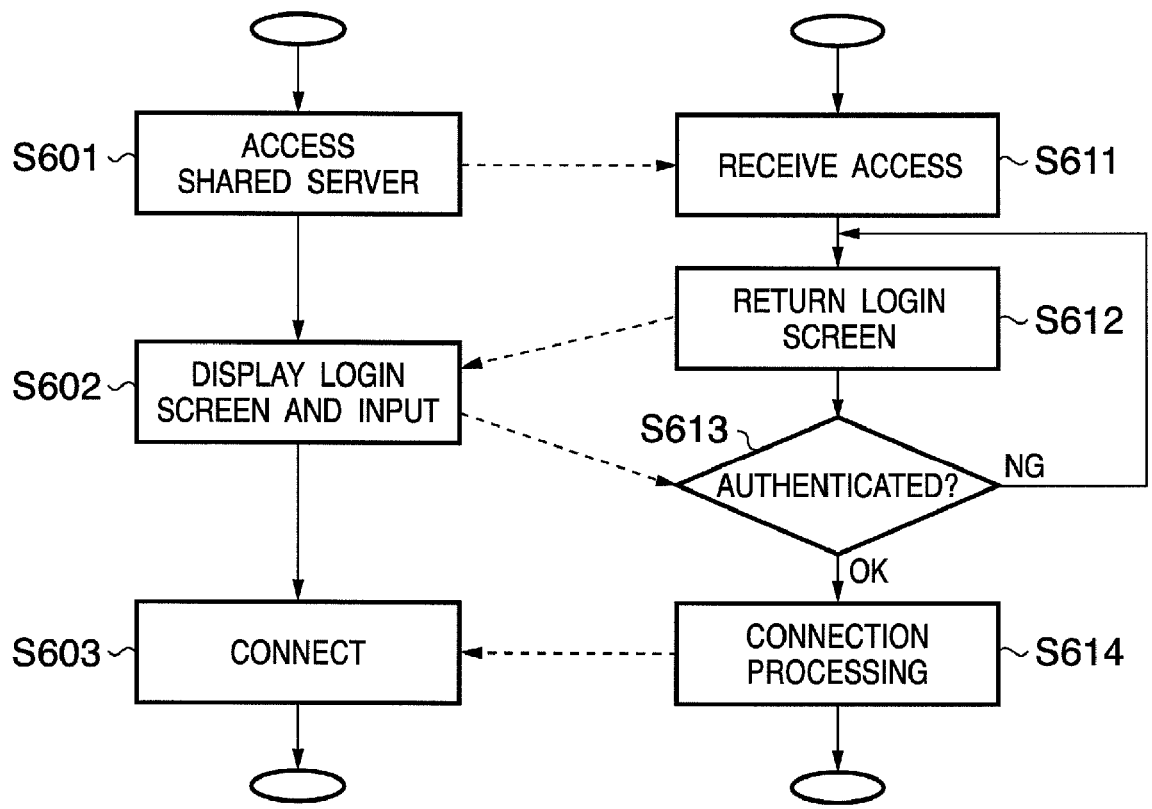
FIG. 6 is a flowchart describing cooperation processing (connection processing) of an information processing apparatus 51 and a shared server 52.

Registering and altering user information regarding user A is realized by, after the information processing apparatus 51 logged in by user A establishes connection with the shared server 52 by the procedure shown in FIG. 6, transmitting a user information registration request to the shared server 52. In response to the user information registration request, the user information setting unit 1104 is activated, and user information is registered and set in the user information storage unit 1131 in association with the request originating user.

A user information acquisition method for task parameter setting can be given as follows. That is, each time a user generates a user-personal task and registers it in the server, user information is automatically collected and accumulated. According to this method, minimal user information is registered at the time of account registration in the server, and information is progressively collected to enhance user's personal profiles. User information set in this manner will be referred to as "user information collected by existing task cooperation flow." The collecting method of the "user information collected by existing task cooperation flow" has, for instance, the following procedure:

(1) A user generates one or more user-personal tasks;
(2) The server automatically collects parameter values of each task included therein;
(3) The collected parameters are stored as account information stored in the server (similarly to the "user information registered and set by the user"), thereby automatically complementing the account information;
(4) Note, if a plurality of the same type of parameters are included in the all personal-tasks generated by the user, the parameter value that is set more frequently is prioritized.

A user information acquisition method for task parameter setting can further be given as follows. That is, a setting that is highly frequently adopted by the print processing apparatus logged in and used by the user is automatically collected. The user information collected by this method will be referred to as "user information collected from a print processing apparatus logged in and used by the user." In this case, the user of the print processing apparatus must be specified by letting the user login with a password or the like. Furthermore the system must be integrated so that the login information is connected to the user information in the shared server 52. The collecting method of the "user information collected from the print processing apparatus logged in and used by the user" has, for instance, the following procedure:

(1) A user logs in to the print processing apparatus (e.g., multi-function peripheral) using a password, a magnetic card or the like;
(2) The user performs copying, FAX transmission or the like from this apparatus;
(3) In a case where this apparatus is registered in the shared server 52 of the task flow, the parameter values of the operation (double-side setting for copying, FAX number and the like) are transmitted from the apparatus to the shared server 52;
(4) The transmitted parameter values complement the account information of the logged-in user on the shared server 52;
(5) The log of the parameter values used in the apparatus is stored in the shared server 52, and frequently used parameter values are overwritten in the account information.

Note if user information cannot be acquired in step S906, the initial parameter values set at the time of flow generation are used.

As has been described above, according to the first embodiment, a task cooperation processing flow subjected to sharing is registered while parameters of the task are altered in accordance with user information of respective users, so that the processing flow can be used by respective users. Accordingly, a task cooperation processing flow subjected to sharing can be registered in a manner that operation adapted to each user's usage style is realized. Furthermore, since the task management attribute enables parameter setting for an all-user task or a user-personal task with respect to each task, it is possible to reflect in detail the designer's intention in sharing the task cooperation processing flow.

Second Embodiment

In the first embodiment, either an "all-user task" or a "user-personal task" is designated as the task management attribute. However, the types of task are not limited to these two. For instance, in addition to the two types, a "group task" may be provided. By virtue of adding the "group task," the following situation can be handled.

More specifically, in a corporate organization, assume that there is a company-wide task cooperation processing flow shared server and anyone in the company can register a task cooperation processing flow in the server. In this case, for instance, there are company-wide tasks to be managed centrally, prescribed tasks of each subordinate organization to which individuals belong (division, department), and personal tasks. In such circumstance, each user wants to scan a document in accordance with the setting such as a resolution determined by his/her own department, but the setting may differ for each department of the company. Such problem can be solved by providing a "group task" category. More specifically, when a task cooperation processing flow is copied to the user area of each user, setting parameters of a task having the "group task" category are replaced by setting parameters decided by the group the user belongs to. Therefore, parameter setting that varies for each group can be applied with ease.

Figure 11:
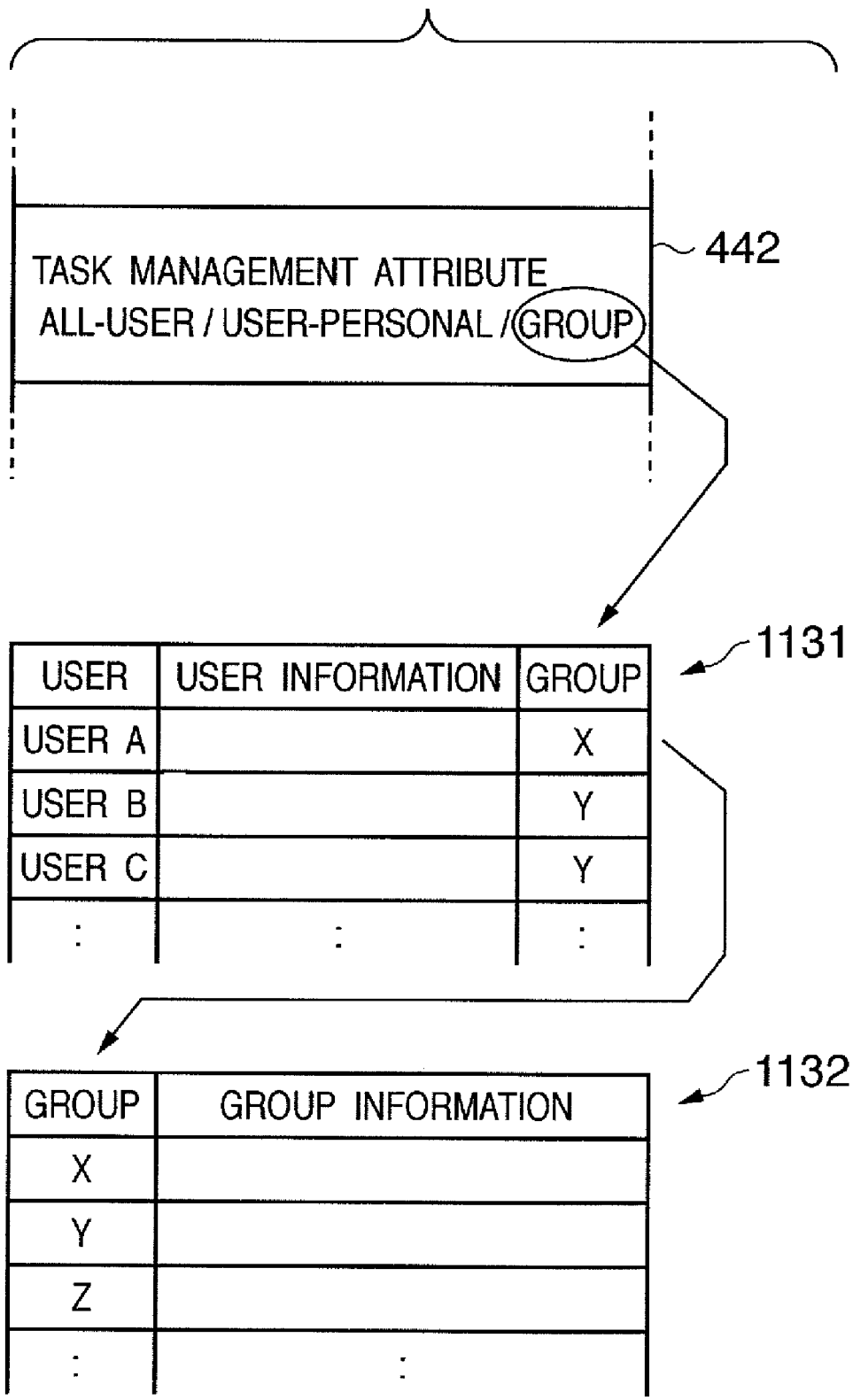
FIG. 11 is an explanatory view of task management attributes according to the second embodiment.

The operation of the second embodiment is further described with reference to FIG. 11. In the task management attribute 442 registered for each task of the task cooperation processing flow, "all-user task," "user-personal task," or "group task" is set as the information regarding task parameter setting. In a case where the "all-user task" or "user-personal task" is set, parameter alteration is performed as described in the first embodiment. In a case where the "group task" is set as the task management attribute 442, the group of the user corresponding to the registration destination area is acquired from the user information stored in the user information storage unit 1131. For instance, in the user information storage unit 1131 in FIG. 11, group Y is registered as user B's group. If a "group task" is set in the task management attribute 442, group information corresponding to group Y, to which user B belongs, is acquired from the group information storage unit 1132, and task parameter alteration is performed in accordance with the group information.

It is preferable that the "group task" be defined in plural hierarchies in accordance with the organizational size. This is to handle, for instance, task cooperation processing flows that are shared by plural groups such as the main office, branch office, division, and department. In this case, the task management attribute is categorized by "group 1 (department)," "group 2 (division)," "group 3 (branch office)," and so on. Instead of such symbolic names like "group 1, 2 or 3," specific names of the department, division, branch office and so on may be recorded as the task management attribute. In this case, belonging group 1, 2 or 3 of each user is registered in the user information. If "group 3" is designated in the task management attribute, parameters are altered by referring to the group information of the belonging group (branch office the user belongs to) which is described in group 3 of the user information.

The hierarchical structure such as the main office, branch office, division, and department may be registered in the group information storage unit 1132, and the lowest hierarchy group (e.g., department the user belongs to) only may be registered as the belonging group. For instance, when "branch office" is designated as the task management attribute 442, the hierarchical structure is traced from the lowest hierarchy group (department) set in the user information to obtain the group corresponding to the user (branch office the user belongs to) in the "branch" hierarchy.

As has been described above, according to the second embodiment, when operating the task cooperation processing flow shared server in a large organization having groups, detailed task automatic setting is possible.

Third Embodiment

The aforementioned first embodiment cites the method of using user information registered and set by the user, the method of collecting user information from the existing task cooperation processing flow generated by the user, and the method of collecting user information from the print processing apparatus logged in by the user. The first embodiment determines user information by one of these methods. In the third embodiment, instead of using one of these methods, a plurality of these methods are used and a value obtained by these methods is employed.

To combine plural methods, the third embodiment enables priority level setting with respect to the plural methods. For instance, priority levels are set in the following manner: user information set by the user is adopted by priority; if there is no such user information, user information is colleted from the existing task cooperation processing flow; and if there is no such information, user information is collected from the print processing apparatus. This way provides an advantage in that the user employing the task cooperation processing flow can reflect his/her intended setting parameters. Further, if priority levels are set in a way that the processing of collecting user information from the print processing apparatus is most prioritized, it is possible to reflect the setting that is highly frequently used by users employing this flow before execution of the flow. This provides an advantage of reflecting user's orientation in real time.

The priority level may be set for an entire task cooperation processing flow, or may be set separately for each task included in the task cooperation processing flow. For instance, with respect to a print task, the collected user information from the print processing apparatus may be prioritized for setting format parameters or the like; and with respect to a mail transmission task, the user information set by the user may be prioritized for setting the transmission destination parameters adapted to the user.

FIG. 12 is an explanatory view of an operation example of the user information acquisition unit 1103 according to the third embodiment. The task management attribute 442 of each task included in the task cooperation processing flow has a task attribute designation 442a that indicates an "all-user task" or a "user-personal task," and a parameter acquisition method designation 442b that designates a parameter acquisition method.

In step S1201, the user information acquisition unit 1103 (FIG. 10) acquires the task management attribute 442 of the task subjected to processing to determine whether or not the parameter acquisition method designation 442b is described. If the parameter acquisition method designation 442b is described, the control proceeds from step S1202 to S1203 where a user information acquisition method is decided in accordance with the parameter acquisition method designation 442b. For instance in a case where the parameter acquisition method designation 442b describes the priority ranks of parameter acquisition methods, the parameter acquisition method is decided in accordance with the priority ranks. In a case where the parameter acquisition method designation 442b directly describes the parameter acquisition method to be employed, the designated parameter acquisition method is decided as the acquisition method. Meanwhile, if no parameter acquisition method designation 442b is described, the control proceeds from step S1202 to S1204, and a user information acquisition method is decided in accordance with priority ranks set in advance. In step S1205, user information is acquired by the acquisition method decided in step S1203 or S1204. Then the control proceeds from step S1205 to S1206 where the acquired user information is notified to the alteration execution unit 1102c.

As has been described above, according to the third embodiment, when there is a parameter item that is often used in the device, the setting of the item is prioritized to reflect the setting that is adapted to the current condition.

Fourth Embodiment

In the above-described third embodiment, when user information is acquired from the existing task cooperation processing flow or the print processing apparatus, the setting that is highly frequently used may basically be employed as a candidate. By letting a user confirm the collected setting parameters before execution of the processing, the user can confirm that the processing is executed with desired setting. As a result, it is possible to execute the task cooperation processing flow that is more surely adapted to user's intention. Note that, by determining the setting parameters in accordance with the respective plural parameter acquisition methods described in the foregoing embodiments, plural setting parameters can be obtained with respect to one same parameter item.

Figure 13A:
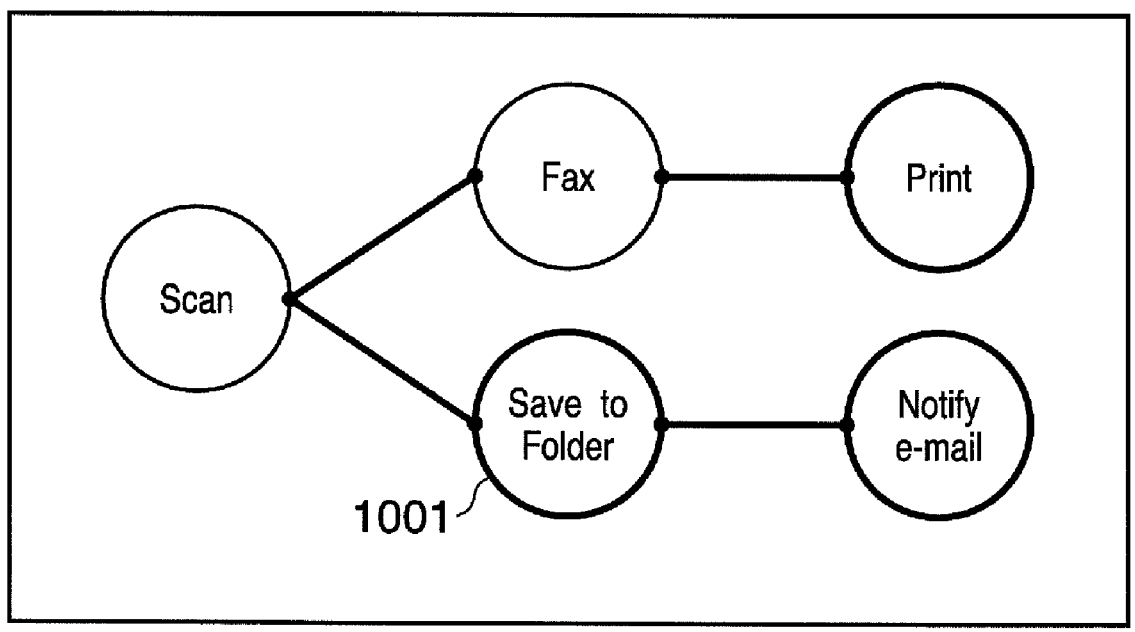
FIG. 13A is a view showing an example of a user interface according to the fourth embodiment.

To confirm setting parameters, the setting is displayed on a screen in a manner that the user understands the task having plural setting parameter candidates. For instance, by expressing the task with heavy lines, existence of plural parameter setting candidates is expressed. FIG. 13A shows that there are tasks having plural parameter setting candidates, and the tasks are marked with heavy circles 1001.

Figure 13B:
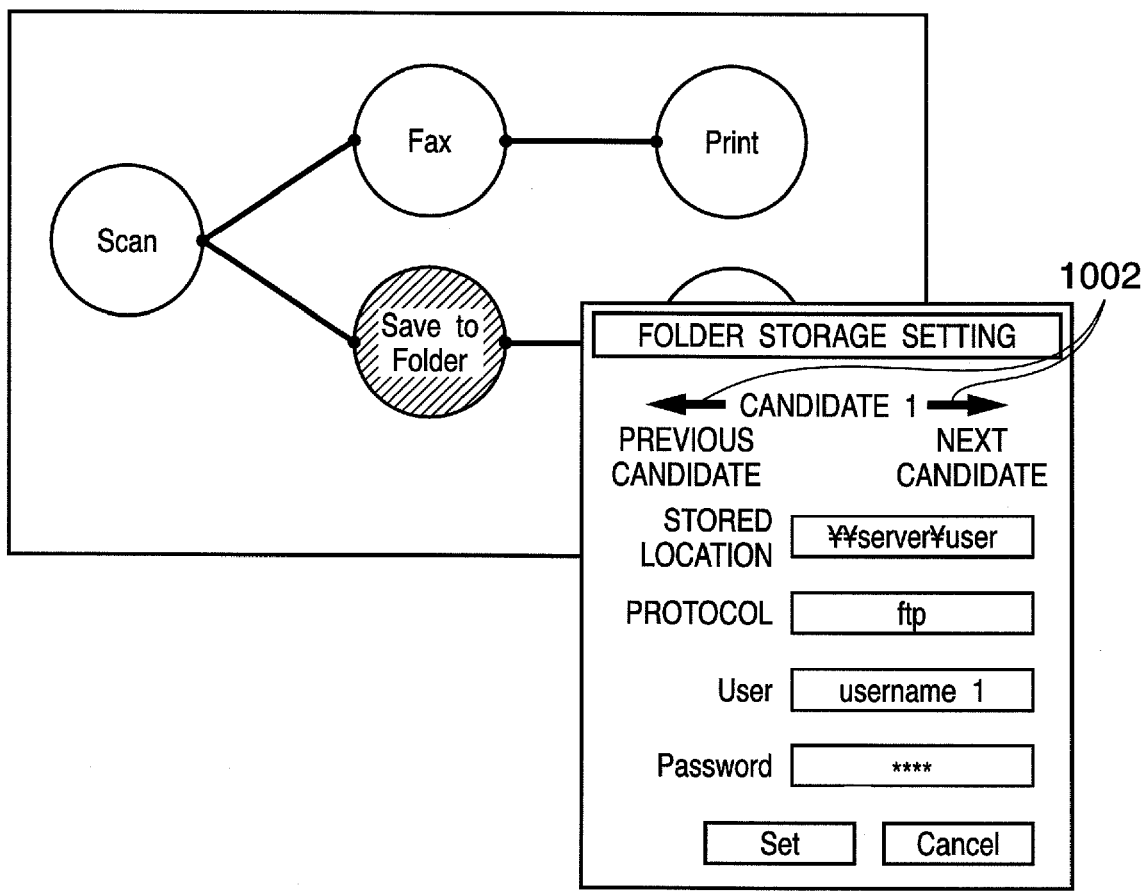
FIG. 13B is a view showing an example of a user interface according to the fourth embodiment.

FIG. 13B shows a state where one of these tasks is selected and setting parameters of the selected task are displayed. On this screen, designating the arrow 1002, provided for switching to other candidates, causes another candidate to appear. If there is no limitation on the processing apparatus, a temporary setting value may be inputted on the screen. Note that task selection can be realized by a general graphic user interface (GUI) technique; therefore, detailed descriptions thereof are omitted herein.

Figure 14:
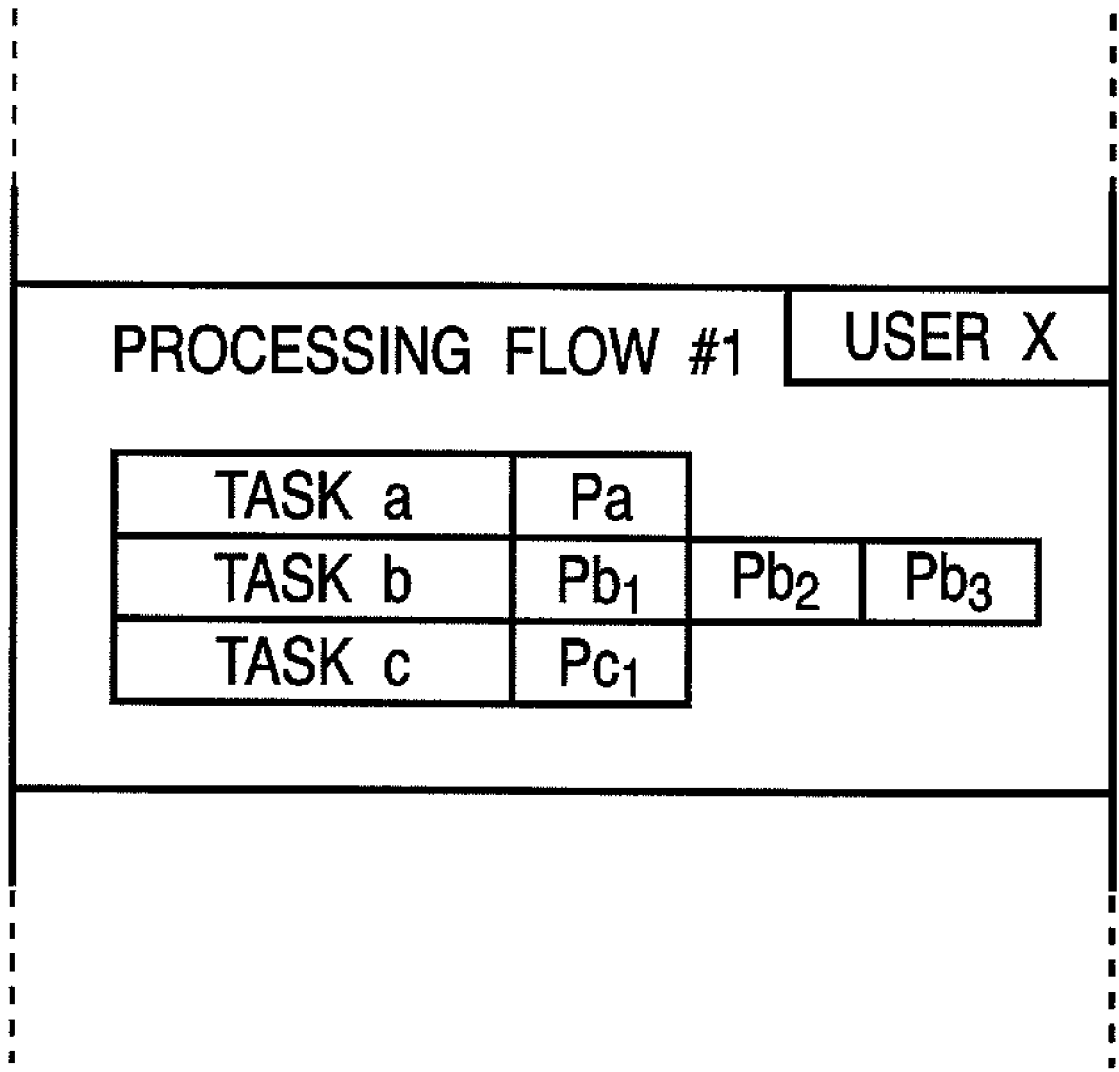
FIG. 14 is a view showing an example of the task cooperation processing flow including a task having plural parameter candidates.
Figure 15:
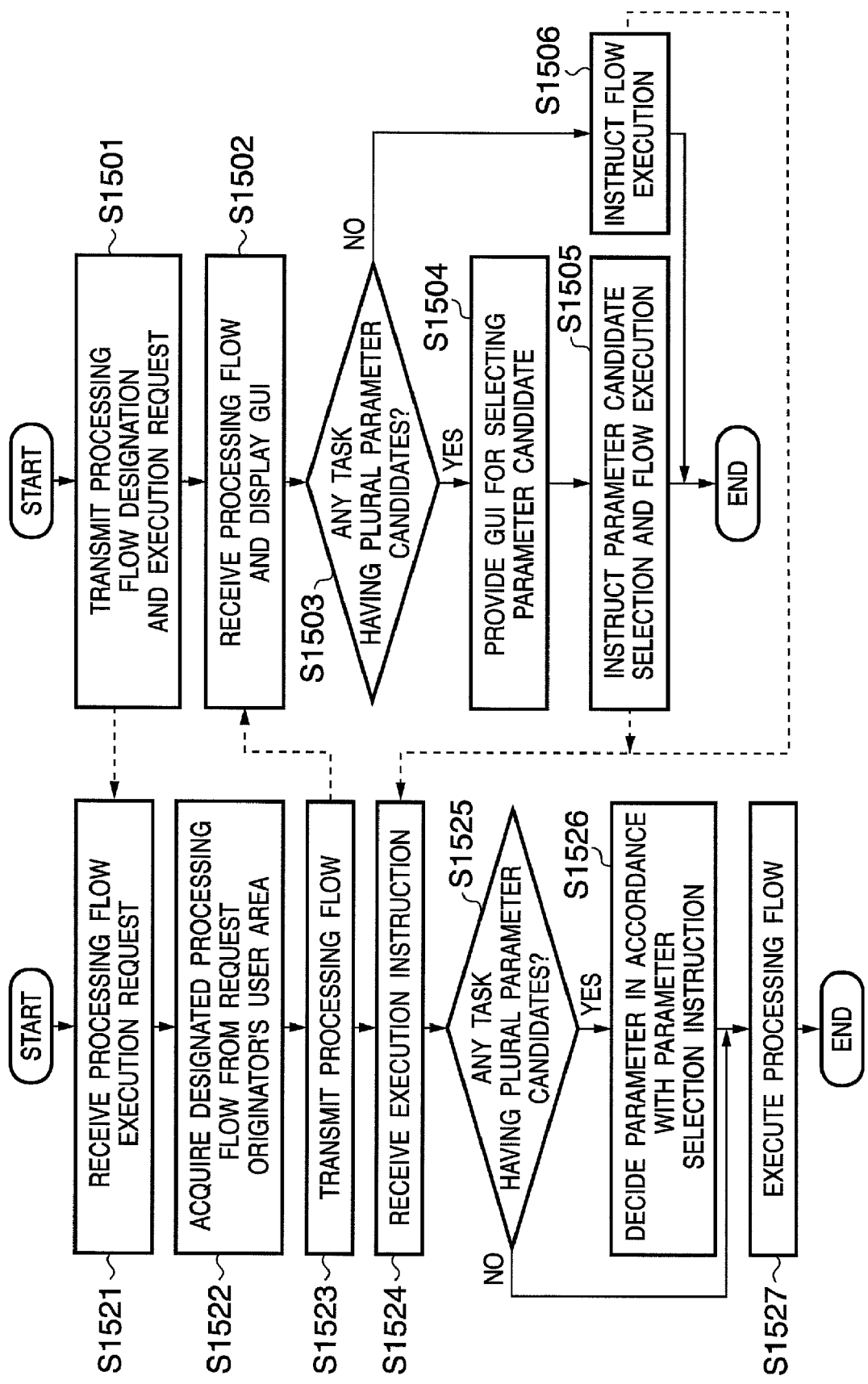
FIG. 15 is a flowchart describing task cooperation processing flow execution processing according to the fourth embodiment.

FIGS. 14 and 15 are views describing the task cooperation processing flow execution processing according to the fourth embodiment. FIG. 14 shows a state where the task cooperation processing flow is registered in the user X area of the database 53, and plural parameter candidates (Pb1, Pb2, Pb3) exist in the task b. Hereinafter, an apparatus (for example, information processing apparatus 51, 55 or print processing apparatus 56) logged in by user X is referred to as "user X apparatus".

In step S1501, after establishing connection with the shared server 52, the user X apparatus transmits processing flow designation and an execution request to the shared server 52. The shared server 52 receives the processing flow execution request in step S1521. In step S1522, the shared server 52 acquires the designated task cooperation processing flow from the user X area of the database 53. In step S1523, the shared server 52 transmits the acquired task cooperation processing flow to the execution request originator. In step S1502, when the user X apparatus receives the task cooperation processing flow from the shared server 52, the contents of the flow are displayed as shown in FIG. 13A. In the display, if it is determined that there is a task having plural parameter candidates in step S1503, the GUI described with reference to FIGS. 13A and 13B is provided in step S1504. In other words, a GUI for selecting a parameter candidate to be actually used is provided. When the user selects a parameter candidate and instructs execution, in step S1505, the parameter candidate selection information and execution instruction are transmitted to the shared server 52. Meanwhile, if there is no task having plural parameter candidates, the control proceeds from step S1503 to S1506, and an execution instruction is transmitted to the shared server 52 in accordance with the processing flow execution instruction inputted by the user. Note in step S1506, the GUI shown in FIG. 13A may be displayed to let the user confirm the contents of the task cooperation processing flow.

The shared server 52 receives the execution instruction from the user X apparatus in step S1524. In step S1525, the shared server 52 determines whether or not the task cooperation processing flow to be executed has a task including plural parameter candidates. If YES, in step S1526 a parameter candidate to be used for each task is decided in accordance with the selection instruction transmitted by the user X apparatus. When there are plural tasks including plural parameter candidates, parameters to be used are decided with respect to all the tasks in accordance with the selection designation. In step S1527, the designated task cooperation processing flow is executed.

As has been set forth above, according to the fourth embodiment, in a case where parameters are decided by collecting information from an information source having plural candidates, it is possible to obtain a task cooperation processing flow that is surely desired by the user.

Fifth Embodiment

In the shared server 52, there is a case where user information is changed in accordance with a user' setting request or in accordance with the altered and re-registered account information (user information) of an existing user. In such case, according to the fifth embodiment, setting parameters of the task cooperation processing flow that has already been copied in the user area are automatically updated using the altered user information.

Figure 16:
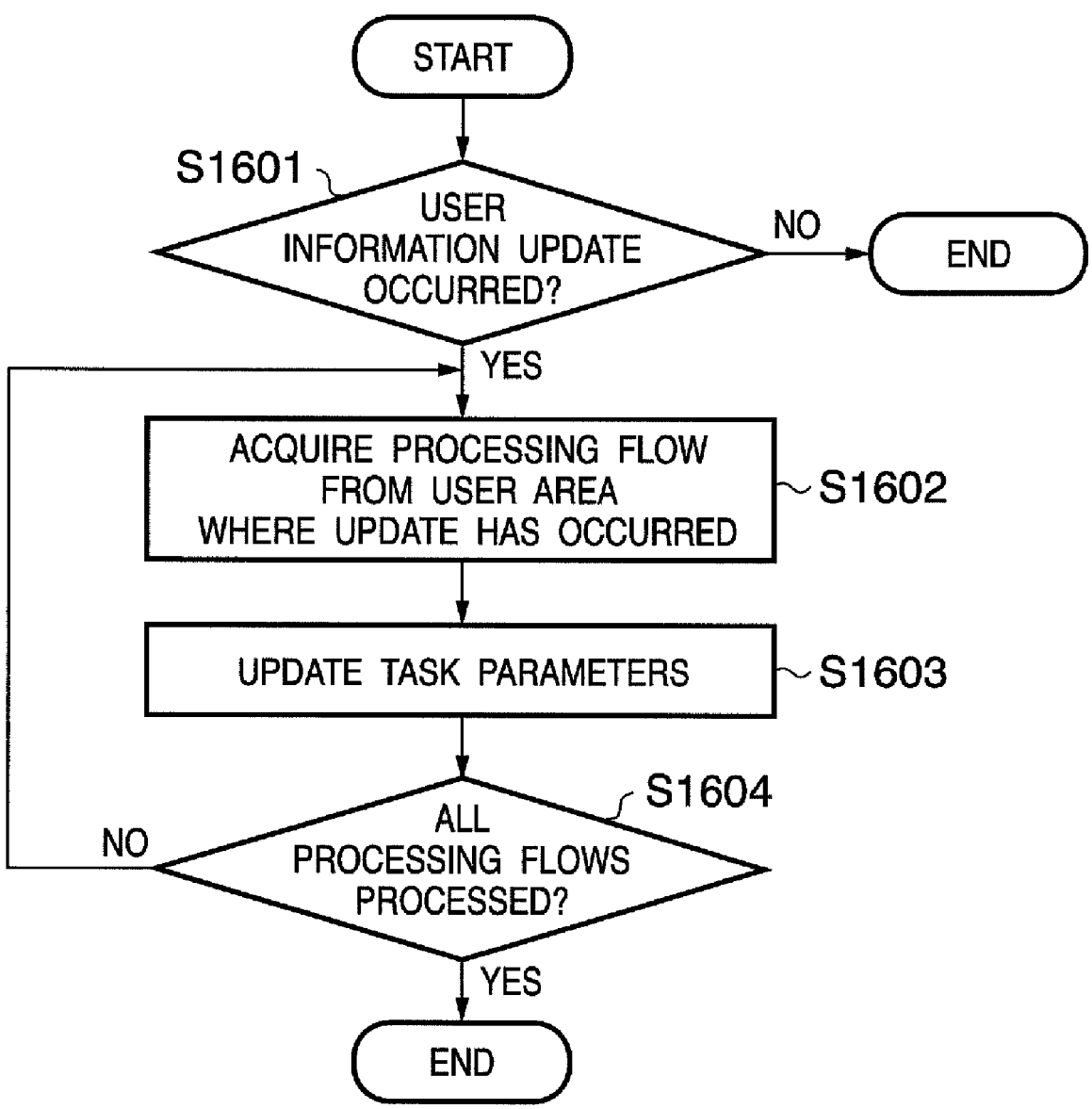
FIG. 16 is a flowchart describing self-updating of the task cooperation processing flow at the time of user information update according to the fifth embodiment.

FIG. 16 is a flowchart describing parameter alteration processing at the time of user information update according to the fifth embodiment. When user information update is detected in step S1601, the control proceeds to step S1602 to acquire task cooperation processing flows registered in the user area where the user information update has just occurred. In step S1603, parameters of each task in the acquired task cooperation processing flow are altered in accordance with the updated user information. The above processing of steps S1602 and S1603 is executed with respect to all task cooperation processing flows registered in the user area (step S1604).

Along with the user information update, it may be so configured that the user is inquired whether or not to execute parameter alteration of the task. In this case, a user's update instruction is confirmed before proceeding to the processing of steps S1602 to S1604.

According to the fifth embodiment, when account information is altered, it is possible to update an existing task cooperation processing flow to more-desirable setting that is adapted to newly inputted content. Further, the embodiment provides an advantage in that the user can make good use of the existing task cooperation processing flows that have been registered and can easily alter the information.

Sixth Embodiment

Figure 17:
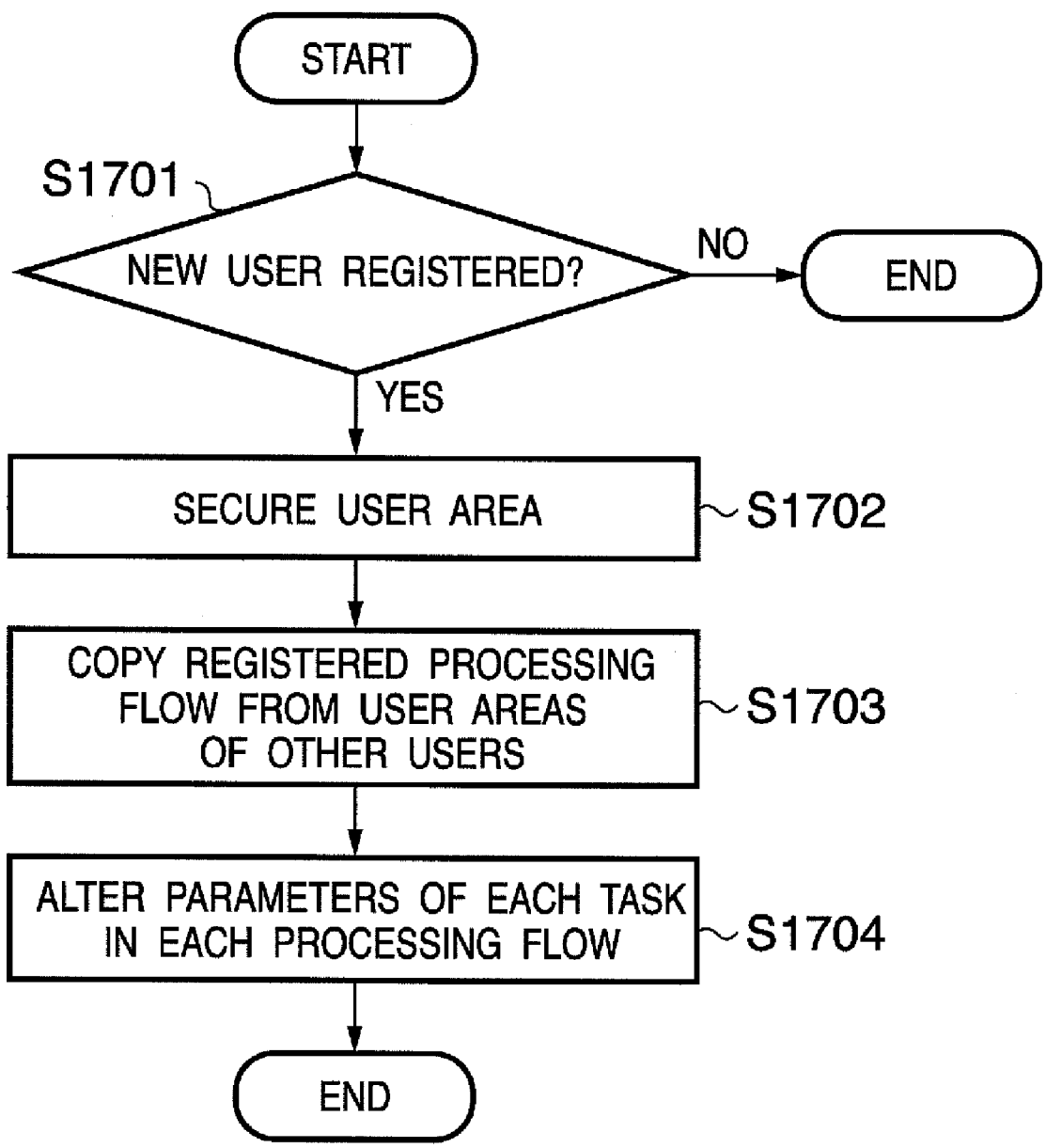
FIG. 17 is a flowchart describing new user registration processing according to the sixth embodiment.

FIG. 17 is a flowchart describing user registration processing according to the sixth embodiment. When a new user account is generated in the shared server 52 in step S1701, a user area for the new user is secured in step S1702. In step S1703, all task cooperation processing flows already registered are copied from user areas of other users to the secured area. Based on the newly registered user account information (user information), setting parameters of respective tasks having the task management attribute "user-personal task" are altered (step S1704).

According to the sixth embodiment, no matter when a user account is registered in the shared server, a user can make good use of the resources registered so far and can immediately share them.

As has been described above, according to each of the above-described embodiments, setting parameters of each task included in a task cooperation processing flow generated by one user can automatically be altered for another user by the task cooperation processing flow shared server. By virtue of this feature, even if the task cooperation processing flow is generated by one user, the flow is stored in a way that it can be adapted to another user. Therefore, the resource of flows generated by one user can easily be reused by a large number of users without wasting the resource, and efficient sharing of the task cooperation processing flows is possible.

Note that the present invention includes a case where the functions of the above-described embodiments are achieved by directly or remotely supplying a software program to a computer system or apparatus, then reading the supplied program codes by a computer of the system or apparatus, and executing the program codes. In this case, the supplied program corresponds to the flowcharts shown in the drawings of the embodiments.

Therefore, the program codes themselves which are installed in a computer to have the computer realize the functions of the present invention also constitute the present invention. In other words, the present invention includes the computer program itself that realizes the functions of the present invention.

In this case, as long as it functions as a program, the form of program codes may be of object codes, a program executed by an interpreter, script data supplied to an OS, or the like.

For a recording medium supplying the program, for instance, a floppy (registered trademark) disk, a hard disk, an optical disk, a magneto-optical disk, MO, CD-ROM, CD-R, CD-RW, a magnetic tape, a non-volatile memory card, ROM, DVD (DVD-ROM, DVD-R) and the like can be used.

As another program supplying method, a home page on the Internet is accessed using a browser of a client computer, and the program according to the present invention is downloaded to a recording medium such as a hard disk. In this case, the downloaded program may be a compressed file including an automatic installation function. The program codes constituting the program according to the present invention may be divided into plural files, and each of the plural files may be downloaded from different home pages. In other words, the present invention also include a WWW server which allows plural users to download the program file that realizes the functions of the present invention using a computer.

Furthermore, the program according to the present invention may be encrypted and stored in a storage medium, e.g., CD-ROM, for user distribution. In this case, a user who satisfies a predetermined condition is allowed to download decryption key data from a homepage on the Internet and execute the encrypted program using the key data to install the program in a computer.

Still further, besides the functions of the above embodiments are realized by executing the read program with a computer, the functions of the above embodiments may be realized in cooperation with an OS (operating system) or the like working on a computer in accordance with designations of the program. In this case, the OS or the like performs part or the entire processes, thereby realizing the functions of the above embodiments.

Furthermore, the program read from the recording medium may be written in a function expansion card which is inserted into the computer or in a memory provided in a function expansion unit which is connected to the computer, and part or all of the functions according to the above-described embodiments may be realized. In this case, after the program is written in the function expansion card or unit, a CPU or the like contained in the function expansion card or unit performs part or the entire processes in accordance with designations of the program.

According to the present invention, in a system for registering a task cooperation processing flow in a sharable manner, it is possible to register a new processing flow in a way that the processing flow can be used by respective users and is adapted to the usage style of each user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-321393 filed on Nov. 4, 2005, which is hereby incorporated by reference herein in its entirety.

What is claimed is:

1. An information processing method of registering a plurality of tasks that execute an individual processing in accordance with a parameter and a processing flow, which defines an order of the plurality of the tasks for cooperation processing, in a manner that the processing flow can be used by a plurality of users, comprising:

a first registration step of registering a first processing flow into storage means in association with a first user in response to a registration request of the first processing flow from the first user;

a copying step of, when registering the first processing flow in association with another user different from the first user, making a copy of the first processing flow as a second processing flow for said another user;

a determining step of, with regard to each task in the second processing flow, determining based on attribute information of the task whether or not the task is a personal task in which the parameter of the task can be altered by said another user;

a first alteration step of altering the parameter of each task in the second processing flow, which is deemed to be a personal task in said determining step, based on parameter information included in a user information set in relation to the another user; and a second registration set of registering the second processing flow, where the parameter has been altered by said first alteration step, into storage means as a processing flow that can be used by said another user.

2. The method according to claim 1, further comprising a setting step of setting, for each of the plurality of users, the parameter information used in said first alteration step.

3. The method according to claim 1, wherein said first altering step uses as said parameter information, a parameter for a task in a processing flow that has already been registered.

4. The method according to claim 1, wherein said first altering step acquires a setting of said another user for an external apparatus and uses the setting as said parameter information.

5. The method according to claim 1, wherein said determining step further determines based on the attribute information of the task, whether or not the task is a group task in which a parameter that has been set in advance for a group to which said another user belongs is applied, and wherein in a case where the attribute information designates a group task, said first alteration step alters the parameter of the task based on parameter information set for the task in the group to which said another user belongs.

6. The method according to claim 1, wherein said first altering step executes plural types of acquisition methods for acquiring the parameter information, and wherein priority ranks are given to said plural types of acquisition methods, and parameter information acquired by an acquisition method having a highest priority rank is employed.

7. The method according to claim 1, wherein said first altering step executes plural types of acquisition methods for acquiring the parameter information, and wherein one of the plural types of acquisition methods is selected based on attribute information set for each task cooperated in the second processing flow, and the parameter information is acquired by executing the selected acquisition method.

8. The method according to claim 1, wherein there are a plurality of altering parameter candidates with respect to one task, wherein said method further comprises a transmission step of, in response to an execution request of the second processing flow from said another user, transmitting the plurality of parameter candidates to an execution request originator of said execution request.

9. The method according to claim 1, further comprising:
a first updating step of updating parameter information of each user;
a second updating step of, in a case where parameter information is updated in said first updating step, updating based on the updated parameter information a parameter of a task included in a processing flow registered in association with a user corresponding to the updated parameter information.

10. The method according to claim 1, further comprising:
a third registration step of registering a new user in addition to said plurality of users;
a fourth registration step of automatically registering all processing flows that have been registered in a sharable manner by said plurality of users in association with the new user when the new user is registered in said third registration step; and
a second alteration step of altering a parameter of a personal task among tasks, which are included in said all processing flows registered in association with the new user, based on user information corresponding to said new user.

11. An information processing apparatus for registering a plurality of tasks that execute an individual processing in accordance with a parameter and a processing flow, which defines an order of the plurality of the tasks for cooperation processing, in a manner that the processing flow can be used by a plurality of users, comprising:
a processor;
a first registration unit adapted to register a first processing flow in association with a first user in response to a registration request of the first processing flow from the first user;
a copying unit configured to, when the first processing flow is registered in association with another user different from the first user, make a copy of the first processing flow as a second processing flow for said another user;
a determining unit configured to, with regard to each task in the second processing flow, determine based on attribute information of the task whether or not the task is a personal task in which the parameter of the task can be altered by said another user;
a first alteration unit adapted to alter the parameter of each task in the second processing flow, which is determined to be a personal task by said determining unit, based on parameter information included in a user information set in relation to said another user; and
a second registration unit adapted to register the second processing flow, where the parameter has been altered by said first alteration unit as a processing flow that can be used by said another user.

12. An information processing system having a server apparatus that stores a plurality of tasks that execute an individual processing in accordance with a parameter and a processing flow, which defines an order of the plurality of the tasks for cooperation processing, in a manner that the processing flow can be used by a plurality of users, comprising:
a processor;
in the server apparatus, a first registration unit adapted to register a first processing flow in association with a first user in response to a registration request of the first processing flow from the first user;
in the server apparatus, a copying unit configured to, when the first processing flow is registered in association with another user different from the first user, make a copy of the first processing flow as a second processing flow for said another user;
a determining unit configured to, with regard to each task in the second processing flow, determine based on attribute information of the task whether or not the task is a personal task in which the parameter of the task can be altered by said another user;
a first alteration unit adapted to alter the parameter of each task in the second processing flow, which is determined to be a personal task by said determining unit, based on parameter information included in a user information set in relation to said another user; and
in the server apparatus, a second registration unit adapted to register the second processing flow, where the parameter has been altered by said first alteration unit as a processing flow that can be used by said another user; and
in the server apparatus, an execution unit adapted to execute the first processing flow and the second processing flow registered in association with the first user and said another user in response to processing requests from the first user and said another user.

13. A computer readable storage medium that stores a control program that causes a computer to execute an information processing method of registering a plurality of tasks that execute an individual processing in accordance with a parameter and a processing flow, which defines an order of the plurality of the tasks for cooperation processing, in a manner that the processing flow can be used by a plurality of users, comprising:
a first registration step of registering a first processing flow into storage means in association with a first user in response to a registration request of the first processing flow from the first user;
a copying step of, when registering the first processing flow in association with another user different from the first user, making a copy of the first processing flow as a second processing flow for said another user;

a determining step of, with regard to each task in the second processing flow, determining based on attribute information of the task whether or not the task is a personal task in which the parameter of the task can be altered by said another user;

a first alteration step of altering the parameter of each task in the second processing flow, which is deemed to be a personal task in said determining step, based on parameter information included in a user information set in relation to the another user; and a second registration set of registering the second processing flow, where the parameter has been altered by said first alteration step, into storage means as a processing flow that can be used by said another user.

* * * * *